United States Patent
Hwang et al.

(10) Patent No.: US 12,499,175 B2
(45) Date of Patent: Dec. 16, 2025

(54) MATRIX MULTIPLICATION METHOD AND DEVICE BASED ON WINOGRAD ALGORITHM

(71) Applicant: REBELLIONS INC., Seongnam-si (KR)

(72) Inventors: Seok Joong Hwang, Seoul (KR); Won Sub Kim, Seoul (KR); Moo Kyoung Chung, Seoul (KR)

(73) Assignee: REBELLIONS INC., Seongnam-si (KR)

( * ) Notice: Subject to any disclaimer, the term of this patent is extended or adjusted under 35 U.S.C. 154(b) by 1059 days.

(21) Appl. No.: 17/613,932

(22) PCT Filed: May 29, 2020

(86) PCT No.: PCT/KR2020/006965
§ 371 (c)(1),
(2) Date: Nov. 23, 2021

(87) PCT Pub. No.: WO2020/262825
PCT Pub. Date: Dec. 30, 2020

(65) Prior Publication Data
US 2022/0309127 A1    Sep. 29, 2022

(30) Foreign Application Priority Data

Jun. 27, 2019    (KR) .................. 10-2019-0077200

(51) Int. Cl.
*G06F 17/16* (2006.01)
*G06F 7/544* (2006.01)

(52) U.S. Cl.
CPC ............ *G06F 17/16* (2013.01); *G06F 7/5443* (2013.01)

(58) Field of Classification Search
CPC .... G06F 7/5443; G06F 15/80; G06F 15/8007; G06F 15/8015; G06F 15/8023; G06F 15/8046; G06F 17/16
See application file for complete search history.

(56) References Cited

U.S. PATENT DOCUMENTS

| | | |
|---|---|---|
| 2017/0344876 A1 | 11/2017 | Brothers |
| 2018/0189237 A1 | 7/2018 | Werner et al. |

(Continued)

FOREIGN PATENT DOCUMENTS

| | | |
|---|---|---|
| CN | 109190756 A | 1/2019 |
| CN | 109937416 A | 6/2019 |

(Continued)

OTHER PUBLICATIONS

S.-G. C. Sau-Gee Chen, J.-C. L. Jiann-Cherng Lee and C.-C. L. Chieh-Chih Li, "New Systolic Arrays for Matrix Multiplication," 1994 Internatonal Conference on Parallel Processing vol. 2, North Carolina, USA, 1994, pp. 211-215, doi: 10.1109/ICPP. 1994. 134. (Year: 1994).*

(Continued)

*Primary Examiner* — Andrew Caldwell
*Assistant Examiner* — Phat N Le
(74) *Attorney, Agent, or Firm* — BROADVIEW IP LAW, PC

(57) ABSTRACT

A Winograd algorithm multiplies a first matrix by a second matrix to generate a third matrix. A plurality of second accumulated value calculation units, accumulates second multiplication values obtained by multiplying each of paired element values of the second matrix, a second accumulated value output unit outputting selecting and outputting one of output values of adjacent second accumulated value calculation unit and an accumulated second multiplication value as a second accumulated value, a third accumulated value (Continued)

output unit including a plurality of third accumulated value calculation units and generating third accumulated value, and one or more row element value calculation units, of which one row element value calculation unit accumulates first matrix element multiplication values obtained by multiplying each of the paired element values of the first matrix, and calculates element values of the third matrix using the accumulated first matrix element multiplication value and the second accumulated value.

13 Claims, 11 Drawing Sheets

(56) References Cited

U.S. PATENT DOCUMENTS

| | | |
|---|---|---|
| 2019/0130250 A1 | 5/2019 | Park et al. |
| 2019/0236442 A1 | 8/2019 | Chen et al. |

FOREIGN PATENT DOCUMENTS

| | | |
|---|---|---|
| JP | 2017-021483 A | 1/2017 |
| KR | 10-2017-0135752 A | 12/2017 |
| KR | 10-2019-0029515 A | 3/2019 |
| KR | 10-2019-0048073 A | 5/2019 |
| WO | WO 2017-006512 A1 | 1/2017 |

OTHER PUBLICATIONS

Lee, D. L., and M. A. Aboelaze. "Linear Speedup of Winograd's Matrix Multiplication Algorithm Using an Array Processor." The Sixth Distributed Memory Computing Conference, 1991. Proceedings. IEEE Computer Society, 1991. (Year: 1991).*
PCT International Search Report and Written Opinion, PCT/KR2020/006965, Aug. 28, 2020, 9 pages.
Extended European Search Report of EP 20833287.4-1203/ 3971740 PCT/KR2020006965 Mailed on Jun. 9, 2023.
Benaini A et al: "An even faster systolic array for matrix multiplication", Parallel Computing, Elsevier, Amsterdam, NL, vol. 12, No. 2, Nov. 1, 1989 (Nov. 1, 1989), pp. 249-254, XP024229876, ISSN: 0167-8191, DOI: 10.1016/0167-8191(89)90057-4.
Jagadish H V et al: "A Family of New Efficient Arrays for Matrix Multiplication", IEEE Transactions on Computers, IEEE, USA, vol. 38, No. 1, Jan. 1, 1989 (Jan. 1, 1989), pp. 149-155, XP000097033, ISSN: 0018-9340, DOI: 10.1109/12.8739.
Yuan S et al: "Unified approach to designing parallel Winograd algorithms", IEE Proceedings: Computers and Digital Techniques, IEE, GB, vol. 141, No. 3, May 1, 1994 (May 1, 1994 ), pp. 161-168, XP006001594, ISSN: 1350-2387, DOI: 10.1049/IP-CDT:19949981.
Office Action of the corresponding Chinese Application No. 202080047277.3 mailed on Aug. 20, 2024.

* cited by examiner $$\begin{pmatrix} z_{11} & z_{12} & \cdots & z_{1m} \\ z_{21} & z_{22} & \cdots & z_{2m} \\ & & \cdots & \\ z_{n1} & z_{n2} & \cdots & z_{nm} \end{pmatrix} = \begin{pmatrix} x_{11} & x_{12} & \cdots & x_{1p} \\ x_{21} & x_{22} & \cdots & x_{2p} \\ & & \cdots & \\ x_{n1} & x_{n2} & \cdots & x_{np} \end{pmatrix} \times \begin{pmatrix} y_{11} & y_{12} & \cdots & y_{1m} \\ y_{21} & y_{22} & \cdots & y_{2m} \\ & & \cdots & \\ y_{p1} & y_{p2} & \cdots & y_{pm} \end{pmatrix}$$

FIG. 1

MATRIX MULTIPLICATION METHOD AND DEVICE BASED ON WINOGRAD ALGORITHM

CROSS-REFERENCE TO RELATED APPLICATION

This application is a National Phase Entry Application of PCT Application No. PCT/KR2020/006965, filed on May 29, 2020, which claims priority to Korean Patent Application No. 10-2019-0077200, filed on Jun. 27, 2019, in the Korean Intellectual Property Office, the entire contents of which are hereby incorporated by reference in its entirety.

TECHNICAL FIELD

The present disclosure in some embodiments relates to a matrix multiplication method and a matrix multiplication device based on the Winograd algorithm.

BACKGROUND

The statements in this section merely provide background information related to the present disclosure and do not necessarily constitute prior art.

Matrix multiplication is a core operation widely used in many fields such as artificial intelligence, signal processing, and graphics. To efficiently process matrix multiplication in different Application Specific Integrated Circuit (ASIC) products, a specialized hardware operator is used for matrix multiplication. For example, NVIDIA Corp. offers the latest graphics processing unit (GPU) having a built-in tensor core that processes matrix multiplication.

Various algorithms exist for reducing the operation cost required when performing matrix multiplication in an operator for matrix multiplication. Among them, the Winograd algorithm-based matrix multiplication algorithm reduces the number of multiplication operations by half as compared to the ordinary matrix multiplication.

Over the currently available basic hardware designs taking advantage of the Winograd algorithm, an advanced Winograd algorithm-based matrix multiplication design needs to be provided with improvements in various aspects, such as reduced footprint in hardware design, high-speed operation, and double-precision support.

SUMMARY

Technical Problem

An object of the present disclosure in some embodiments is to provide a matrix multiplication device based on the Winograd algorithm for a reduced hardware footprint, improved operation speed, and double-precision in operation.

Technical Solution

According to at least one embodiment of the present disclosure, an operation apparatus operating based on the Winograd algorithm for multiplying a first matrix by a second matrix to generate a third matrix, comprising: a second accumulated value output unit having a plurality of second accumulated value calculation units, of which one second accumulated value calculation unit is configured to accumulate second multiplication values obtained by multiplying each of paired element values of the second matrix, to select one of an output value of an adjacent second accumulated value calculation unit and the accumulated second multiplication value as a second accumulated value, and to output the second accumulated value; a third accumulated value output unit having a plurality of third accumulated value calculation units, of which one third accumulated value calculation unit is configured to generate a first value obtained by adding one element value of paired element values of the first matrix and one element value of the paired element values of the second matrix, to generate a second value obtained by adding the other element value of the paired element values of the first matrix and the other element value of the paired element values of the second matrix, to accumulate a third multiplication value obtained by multiplying the first value by the second value, to select one of an output value of an adjacent third accumulated value calculation unit and the accumulated third multiplication value, as a third accumulated value, and to output the third accumulated value; and an element value calculation unit having one or more row element value calculation units, of which one row element value calculation unit is configured to accumulate element multiplication values of the first matrix obtained by multiplying each of the paired element values of the first matrix, and to calculate element values of the third matrix by subtracting from the third accumulated value an accumulated element multiplication value of the first matrix and the second accumulated value, respectively.

Another embodiment of the present disclosure provides an operation apparatus, comprising an input division unit, a first addition unit, a second addition unit, a multiplication unit, and an accumulator and operating based on the Winograd algorithm for multiplying a first matrix by a second matrix to generate a third matrix, wherein the input division unit is configured to divide each of a bitmap representing one element value of the first matrix, a bitmap representing one element value of the second matrix, a bitmap representing another element value of the first matrix, and a bitmap representing another element value of the second matrix, into an upper divided bitmap and a lower divided bitmap in units of N bits that are of a bit length at an input terminal of the first addition unit, the first addition unit is configured to add the one element value of the first matrix and the one element value of the second matrix to each other for each of selected divided bitmaps that are of equal rank between the upper divided bitmap and the lower divided bitmap, the second addition unit is configured to add the another element value of the first matrix and the another element value of the second matrix to each other selectively for each of selected divided bitmaps that are of equal rank between the upper divided bitmap and the lower divided bitmap, the multiplication unit is configured to calculate a multiplication value by multiplying an addition result of the first addition unit by an addition result of the second addition unit, and the accumulator is configured to accumulate the multiplication value calculated by the multiplication unit.

Another embodiment of the present disclosure provides an operation apparatus, comprising four preprocessors, a first addition unit, a second addition unit, a multiplication unit, a third addition unit, and an accumulator and operating based on the Winograd algorithm for multiplying a first matrix by a second matrix to generate a third matrix, wherein the four preprocessors are each configured to receive paired matrix element values with a length of N bits (where N is a natural number), to place one element value of the paired matrix element values in an upper bitmap on a bitmap with a preset length, to place the other element value of the paired matrix element values in a lower bitmap on the bitmap with the preset length, and to extend signs of element values located in the lower bitmap by copying a sign bit of the other element value to an (N+1)th bit on the bitmap with the preset length to generate 2N+1-bit long bitmap data, the first addition unit is configured to add data to each other that are on a bitmap with a preset length and generated by two preprocessors among the four preprocessors to generate a first result value, the second addition unit is configured to add data to each other that are on a bitmap with a preset length and generated by two other preprocessors among the four preprocessors to generate a second result value, the multiplication unit is configured to multiply by each other a value corresponding to an upper bitmap of the first result value and a value corresponding to an upper bitmap of the second result value to generate an 11th multiplication value, and to multiply by each other a value corresponding to a lower bitmap of the first result value and a value corresponding to a lower bitmap of the second result value to generate a 12th multiplication value, the third addition unit is configured to add the 11th multiplication value and the 12th multiplication value to each other to generate a multiplication result value, and the accumulator is configured to accumulate the multiplication result value.

Another embodiment of the present disclosure provides a method performed by an operation apparatus having a plurality of second accumulated value calculation units, a plurality of third accumulated value calculation units, and one or more row element value calculation units, for multiplying a first matrix by a second matrix to generate a third matrix, the method including i) outputting a second accumulated value by one second accumulated value calculation unit by accumulating second multiplication values obtained by multiplying each of paired element values of the second matrix, to select one of output values of adjacent second accumulated value calculation units and an accumulated second multiplication value as the second accumulated value, and to output the second accumulated value, ii) causing one third accumulated value calculation unit corresponding in position to the one second accumulated value calculation unit to generate a first value obtained by adding one element value of paired element values of the first matrix and one element value of the paired element values of the second matrix, and to generate a second value obtained by adding an other element value of the paired element values of the first matrix and an other element value of the paired element values of the second matrix, iii) causing the one third accumulated value calculation unit to accumulate a third multiplication value obtained by multiplying the first value by the second value, to select one of an output value of an adjacent third accumulated value calculation unit that is adjacent to the one third accumulated value calculation unit and an accumulated third multiplication value, as a third accumulated value and to output the third multiplication value, and iv) causing one row element value calculation unit corresponding in position to the one third accumulated value calculation unit to accumulate first matrix element multiplication values obtained by multiplying each of the paired element values of the first matrix, and to calculate element values of the third matrix by subtracting from the third accumulated value an accumulated first matrix element multiplication value and the second accumulated value, respectively.

Another embodiment of the present disclosure provides a method performed by an operation apparatus having an input division unit, a first addition unit, a second addition unit, a multiplication unit, and an accumulator and operating based on the Winograd algorithm for multiplying a first matrix by a second matrix to generate a third matrix, the method including i) causing the input division unit to divide each of a bitmap representing one element value of the first matrix, a bitmap representing one element value of the second matrix, a bitmap representing an other element value of the first matrix, and a bitmap representing an other element value of the second matrix, into an upper divided bitmap and a lower divided bitmap in units of N bits that are of a bit length at an input terminal of the first addition unit, ii) causing the first addition unit to add the one element value of the first matrix and the one element value of the second matrix to each other for each of selected divided bitmaps that are of equal rank between the upper divided bitmap and the lower divided bitmap, iii) causing the second addition unit to add the other element value of the first matrix and the other element value of the second matrix to each other selectively for each of selected divided bitmaps that are of equal rank between the upper divided bitmap and the lower divided bitmap, iv) causing the multiplication unit to calculate a multiplication value by multiplying an addition result of the first addition unit by an addition result of the second addition unit, and v) causing the accumulator to accumulate multiplication values calculated by the multiplication unit.

Yet another embodiment of the present disclosure provides a method performed by an operation apparatus having four preprocessors, a first addition unit, a second addition unit, a multiplication unit, a third addition unit, and an accumulator and operating based on the Winograd algorithm for multiplying a first matrix by a second matrix to generate a third matrix, the method including i) causing the four preprocessors to each receive paired matrix element values with a length of N bits (where N is a natural number), to place one element value of the paired matrix element values in an upper bitmap on a bitmap with a preset length, to place an other element value of the paired matrix element values in a lower bitmap on the bitmap with the preset length, and to extend signs of element values located in the lower bitmap by copying a sign bit of the other element value to an (N+1)th bit on the bitmap with the preset length to generate 2N+1-bit long bitmap data, ii) causing the first addition unit to add data to each other that are on a bitmap with a preset length and generated by two preprocessors among the four preprocessors to generate a first result value, iii) causing the second addition unit to add data to each other that are on a bitmap with a preset length and generated by two other preprocessors among the four preprocessors to generate a second result value, iv) causing the multiplication unit to multiply by each other a value corresponding to an upper bitmap of the first result value and a value corresponding to an upper bitmap of the second result value to generate an 11th multiplication value, and to multiply by each other a value corresponding to a lower bitmap of the first result value and a value corresponding to a lower bitmap of the second result value to generate a 12th multiplication value, v) causing the third addition unit to add the 11th multiplication value and the 12th multiplication value to each other to generate a multiplication result value, and vi) causing the accumulator to accumulate the multiplication result value.

Advantageous Effects

The present disclosure in some embodiments provides an operation apparatus in a systolic array having core units with some functions detached for providing additional units responsible for the detached functions in a one-dimensional arrangement on the overall systolic array and thereby improves upon a conventional operation apparatus with a single type of units in two-dimensional arrangement on the overall systolic array by a substantial hardware footprint reduction.

Additionally, the present disclosure provides an operation apparatus for allowing its core hardware units to receive data resulting from operations performed by coplanarily adjacent core units and thereby improves upon a conventional operation apparatus by a substantially reduced number of paths for transferring the operation data generated by the core hardware units to the other unit, resulting in a high-speed operation of the operation apparatus.

Further, the present disclosure enables an operation on matrix data of multiple precisions and thereby provides an efficient matrix multiplication device to be designed when processing multiple matrix data of a plurality of precisions.

BRIEF DESCRIPTION OF DRAWINGS

FIG. 1 shows matrix multiplication in which a matrix Z is obtained by multiplying matrices X and Y together.

DETAILED DESCRIPTION

Figure 2:
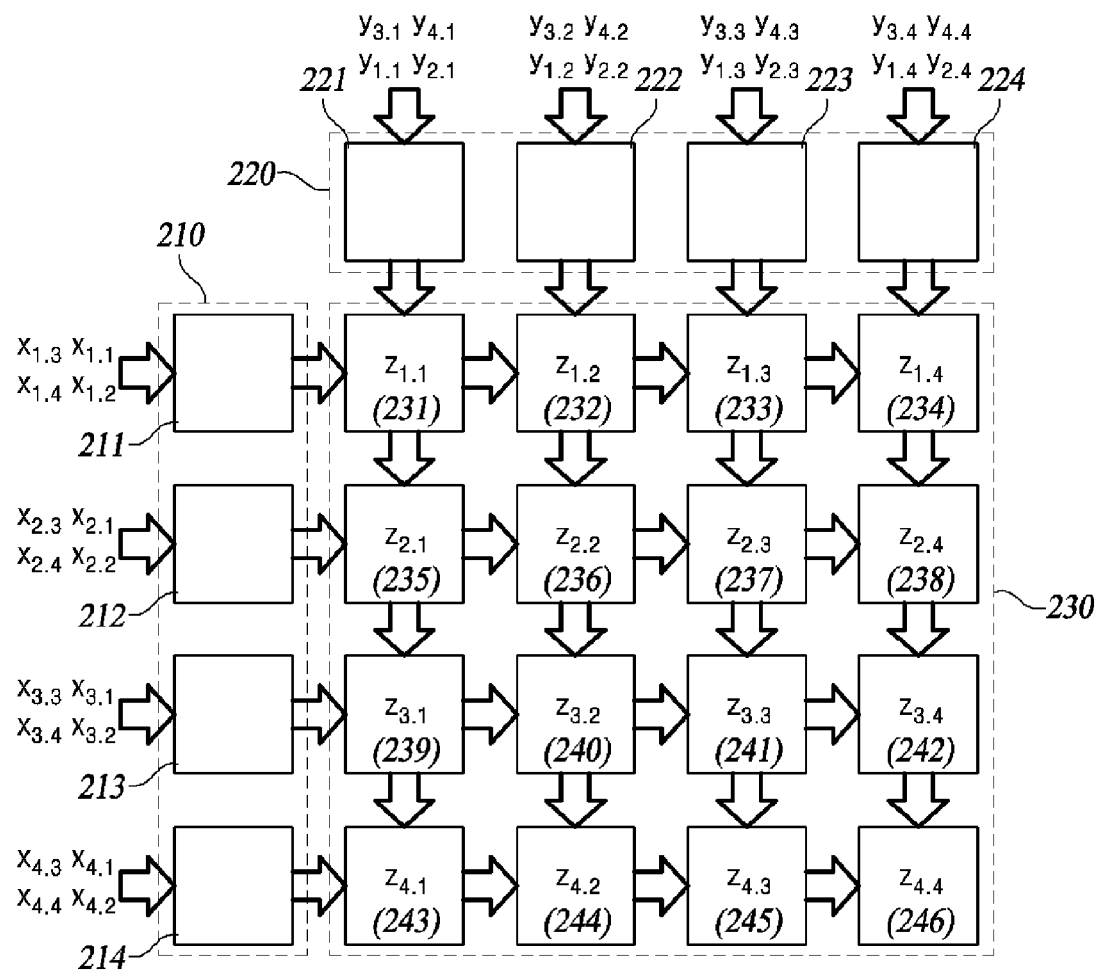
FIG. 2 is a diagram of the configuration of a conventional matrix multiplication device in the form of a systolic array for matrix multiplication based on the Winograd algorithm.

Hereinafter, some embodiments of the present disclosure will be described in detail with reference to the accompanying drawings. In the following description, like reference numerals preferably designate like elements, although the elements are shown in different drawings. In the following description of some embodiments, for clarity and for brevity, no further description related known components and functions is provided.

FIG. 1 shows matrix multiplication in which a matrix Z is obtained by multiplying matrices X and Y together.

As shown in FIG. 1, when the size of matrix X is n×p and the size of matrix Y is p×m, the size of matrix Z becomes n×m, and the value of each element $z_{ij}$ of matrix Z may be calculated as in Equation 1.

$$z_{i,j} = \sum_{k=1}^{p} x_{i,k} \cdot y_{k,j}$$ Equation 1

The multiplication expression of Equation 1 may be expressed as a multiplication expression by using the Winograd algorithm as in Equation 2.

$$z_{i,j} = \sum_{k=1}^{p/2} (x_{i,2k-1} + y_{2k,j}) \cdot (x_{i,2k} + y_{2k-1,j}) -$$
$$\sum_{k=1}^{p/2} x_{i,2k} \cdot x_{i,2k-1} - \sum_{k=1}^{p/2} y_{2k,j} \cdot y_{2k-1,j}$$ Equation 2

In Equation 2, the calculation formula of the second Σ term is commonly applied to each row of elements of matrix Z, and the calculation formula of the third Σ term is commonly applied to each column of elements of matrix Z. Therefore, the second Σ term in Equation 2 may be calculated only once per row with respect to the elements of Z, and the third Σ term in Equation 2 may be calculated only once per column for the elements of Z for obtaining all constituent element values of matrix Z. In addition, when the elements of matrix X or Y always have constant values, the calculation formula of the second or third term Σ of Equation 2 may use a pre-calculated value.

This manner of matrix multiplication performed as in Equation 2 by using the characteristics of the Winograd algorithm reduces the total number of multiplications compared to the matrix multiplication of Equation 1. The greater the matrix Z, the more the matrix multiplication operations drop by almost ½ times the number of matrix multiplications in Equation 1.

In the Winograd algorithm, other than the calculation of the multiplication expression, an additional cost involved in the first Σ term of Equation 2 is addition operations for inputting the multiplications and the accompanied use of a multiplication unit for processing the inputs larger by one bit. It is typical in operations on integer inputs that the cost of the multiplication operator is greater than the addition operator and the operation cost of the integer multiplication unit is proportional to the square of the input bit length. For this reason, the longer the input bit length, the lower the relative additional costs due to those one bit larger multiplication inputs.

Therefore, despite the further addition operations occurring in the first Σ term of Equation 2 and the occurrence of those one bit larger multiplication inputs, the total operation cost required for the matrix multiplication of Equation 2 is significantly reduced compared to the matrix multiplication of Equation 1.

FIG. 2 is a diagram of the configuration of a conventional matrix multiplication device 200 in the form of a systolic array for matrix multiplication based on the Winograd algorithm.

The matrix multiplication device 200 of FIG. 2, which is a matrix multiplier exemplifying multiplying 4×4 matrix X and Y together to calculate and generate the respective elements of a 4×4 matrix Z, includes a first operation unit 210, a 2nd operation unit 220, and a 3rd operation unit 230.

The first operation unit 210 includes a plurality of element-X processing units 211, 212, 213, and 214, the number of which is the same as the maximum allowable number of matrix X rows that can be processed at once. A matrix larger than the maximum allowable number of matrix X rows may be divisively processed by the first operation unit 210. Since the divisive matrix processing is mathematically self-evident, no further description is provided. For convenience, the present disclosure concentrates on matrices that match the maximum matrix size that the operator can process simultaneously. The element-X processing units 211, 212, 213, 214 each receive paired matrix X element values to calculate and generate a multiplication operation value and store the paired element X values and the multiplication operation value.

The 2nd operation unit 220 includes a plurality of element-Y processing units 221, 222, 223, and 224, the number of which is equal to the number of matrix Y columns that can be processed simultaneously. The element-Y processing units 221, 222, 223, 224 each receive paired matrix Y element values to calculate and generate a multiplication operation value and store the paired Y element values and the multiplication operation value, respectively.

The 3rd operation unit 230 receives paired X element values and their multiplication operation value stored in the first operation unit 210 and receives paired Y element values and their multiplication operation value stored in the 2nd operation unit 220 to calculate and generate matrix Z element values.

The 3rd operation unit 230 includes a plurality of element-Z processing units 231, 232, . . . , 246, the number of which is equal to the maximum allowable number of simultaneously processible matrix X rows by the maximum allowable number of simultaneously processible matrix Y columns.

Figure 3:
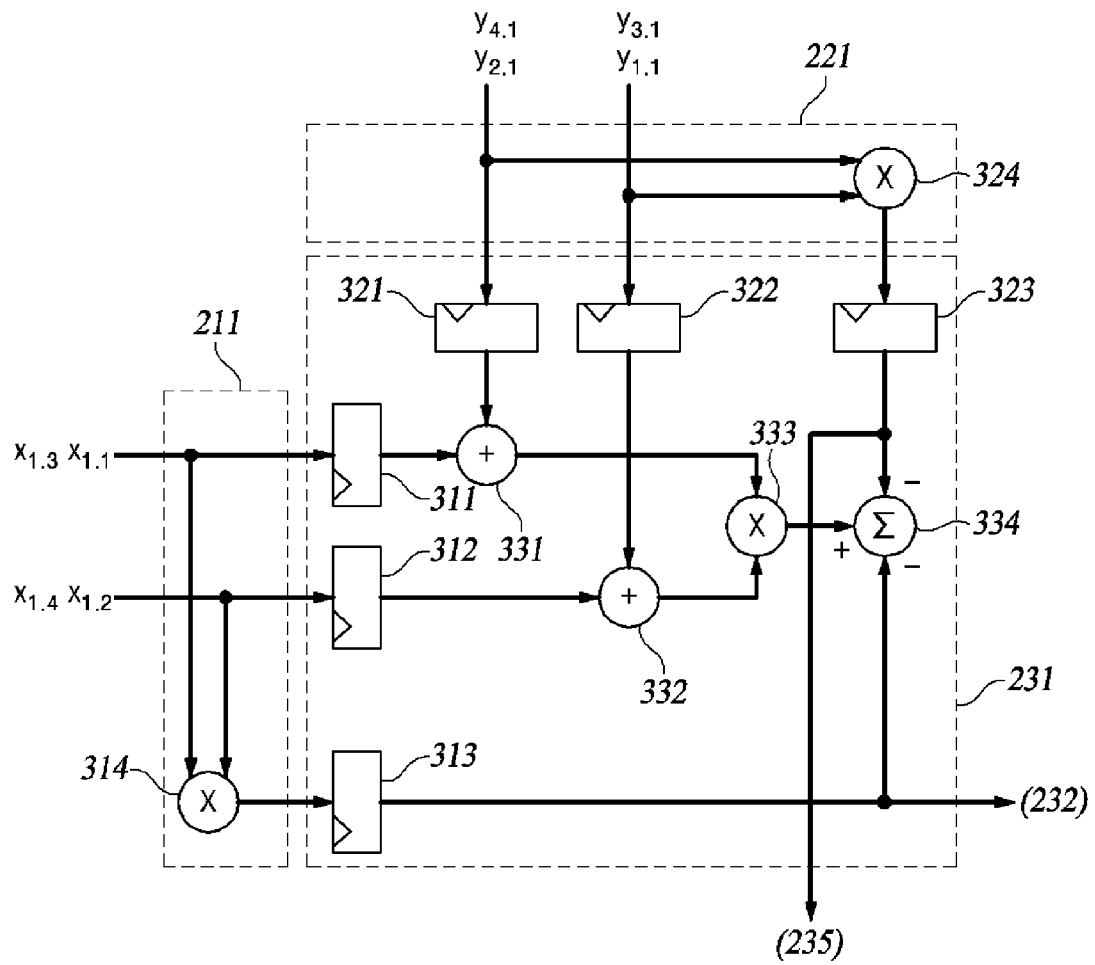
FIG. 3 is a diagram of the internal configurations of a first element-X processing unit, first element-Y processing unit, and first Z-element processing unit in FIG. 2.

FIG. 3 is a diagram of the internal configurations of the first element-X processing unit 211, first element-Y processing unit 221, and first Z-element processing unit 231 in FIG. 2.

The first element-X processing unit 211 includes a first multiplication unit 314.

The first multiplication unit 314 multiplies the first and second matrix X elements by each other to generate a first multiplication value.

The first element-Y processing unit 221 includes a 2nd multiplication unit 324.

The 2nd multiplication unit 324 multiplies the first and second matrix Y elements by each other to generate a second multiplication value.

The first element-Z processing unit 231 includes an 11th storage unit 311, 12th storage unit 312, 13th storage unit 313, 21st storage unit 321, 22nd storage unit 322, 23rd storage unit 323, first addition unit 331, 2nd addition unit 332, 3rd multiplication unit 333, and accumulation operation unit 334.

The 11th storage unit 311 and the 12th storage unit 312 receive and store the first and second matrix X elements, respectively.

The 13th storage unit 313 stores the first multiplication value generated by the first multiplication unit 314.

The 21st storage unit 321 and the 22nd storage unit 322 receive and store the first and second matrix Y elements, respectively.

The 23rd storage unit 323 stores the second multiplication value generated by the 2nd multiplication unit 324.

The first addition unit 331 receives the first matrix X element and the first matrix Y element stored in the 11th storage unit 311 and the 21st storage unit 321, respectively, and it performs addition on the received elements to generate the first added value.

The 2nd addition unit 332 receives the second matrix X element and the second matrix Y element stored in the 12th storage unit 312 and the 22nd storage unit 322, respectively, and it performs addition on the received elements to generate the second added value.

The 3rd multiplication unit 333 receives and multiplies the first added value and the second added value together to generate a third multiplication value.

The accumulation operation unit 334, upon receiving from the first multiplication unit 314, the 2nd multiplication unit 324, and the 3rd multiplication unit 333, the first multiplication value, the second multiplication value, and the third multiplication value, respectively, subtracts from the third multiplication value the first and second multiplication values respectively to generate an accumulated value. The accumulated value calculated here becomes one Z element value of matrix Z.

In FIG. 2, the respective element-Z processing units 231, 232, . . . , 246 receive, from their left-end element-X processing units 211, 212, 213, 214, the first X element values, the second X element values and the multiplication values thereof, and receive, from their top element-Y processing units 221, 222, 223, 224, the first Y element values, the second Y element values, and the multiplication values thereof to calculate Z element values corresponding to the relevant element-Z processing units 231, 232, . . . , 246. For example, the element-Z processing unit 236 receives element values necessary for the operation thereof from its left-end element-X processing unit 212 on the same row and from its top element-Y processing unit 222 on the same column.

Meanwhile, the six storage units 311, 312, 313, 321, 322, and 323 may each be implemented as a flip-flop, the operation of which is obvious to those skilled in the art and will not be described herein.

In FIG. 2, the operation apparatus 200 has more element-Z processing units 231, 232, . . . , 246 of the 3rd operation unit 230 than each of the number of the element-X processing units 211, 212, 213, 214 of the first operation unit 210 and the number of the element-Y processing units 221, 222, 223, 224. For this reason, improving the performance of the operation apparatus 200 needs the 3rd operation unit 230 to be optimized.

As shown in FIGS. 2 and 3, the first element-Z processing unit 231 in the 3rd operation unit 230 receives data for the subtraction operation from the first operation unit 210 and the 2nd operation unit 220, respectively.

Not only the first element-Z processing unit 231 but also the remaining element-Z processing units 232, . . . , 246 all receive data for the subtraction operation from the first operation unit 210 and the 2nd operation unit 220, respectively.

Accordingly, the element-Z processing units 231, 232, . . . , 246 need two-dimensionally arranged paths for transmission of data required for the subtraction operation.

Figure 4:
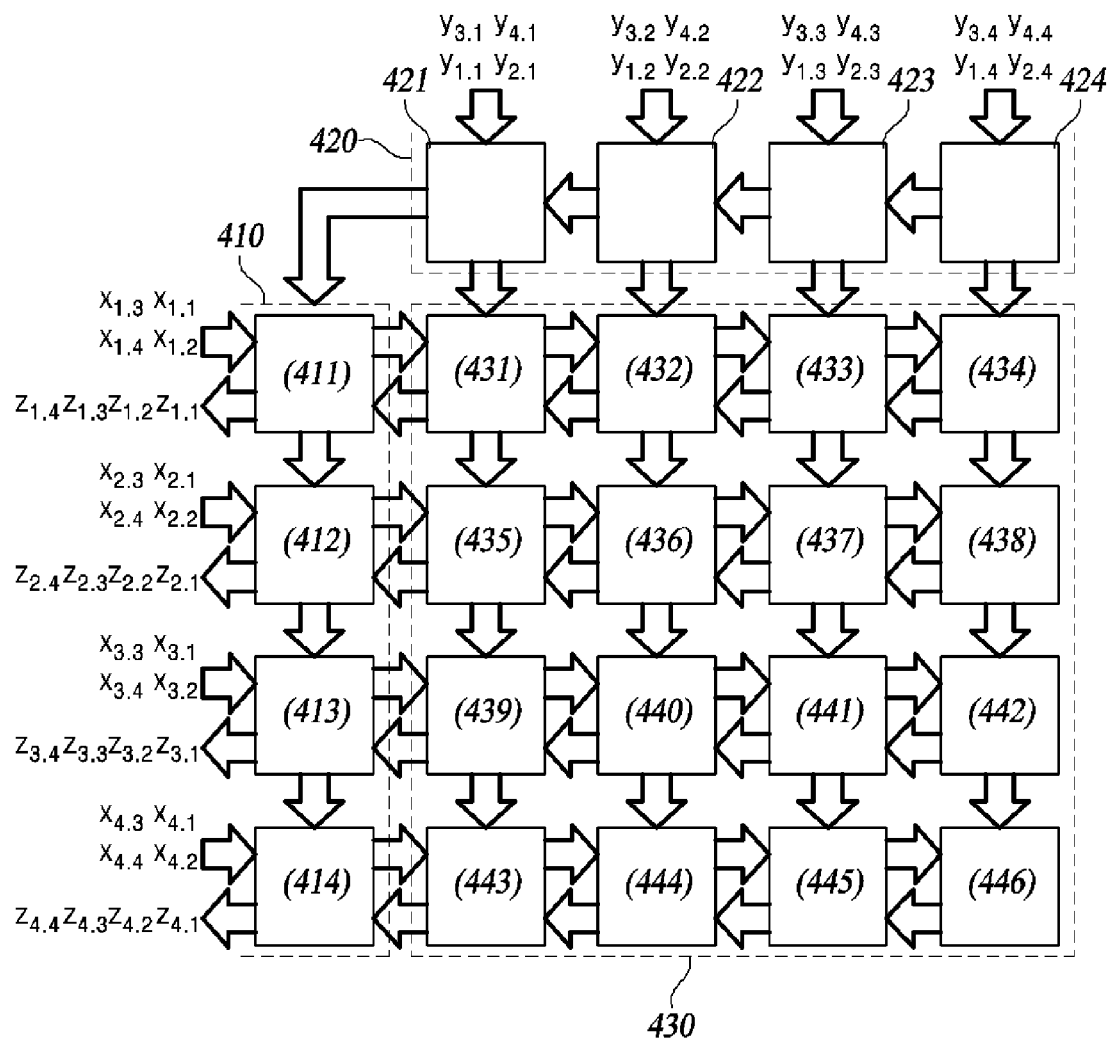
FIG. 4 is a diagram of a configuration of a systolic array type operation apparatus for matrix multiplication based on the Winograd algorithm according to at least one embodiment of the present disclosure.

FIG. 4 is a diagram of the configuration of a systolic array type operation apparatus 400 for matrix multiplication based on the Winograd algorithm according to at least one embodiment of the present disclosure.

The operation apparatus 400 according to at least one embodiment of the present disclosure is illustrated as a matrix multiplication device multiplying each of a first matrix X and a second matrix Y each having a size of 4×4 to generate respective element values of a third matrix Z of a size of 4×4. The operation apparatus 400 includes an element value calculation unit 410, a 2nd accumulated value output unit 420, and a 3rd accumulated value output unit 430.

The element value calculation unit 410 includes a plurality of row element value calculation units 411, 412, 413, and 414. The number of row element value calculation units 411, 412, 413, 414 is 'n' which is a natural number equal to or greater than 1. Here, 'n' may be equal to each of the maximum number of rows of matrix X and the number of rows of the third matrix Z that can be simultaneously processed. This embodiment illustrates an example case where n=4.

The 2nd accumulated value output unit 420 includes a plurality of 2nd accumulated value calculation units 421, 422, 423, and 424. The number of the 2nd accumulated value calculation units 421, 422, 423, 424 is 'm' that is a natural number equal to or greater than 1. Here, 'm' may be equal to each of the maximum number of columns of matrix Y and the number of columns of matrix Z that can be simultaneously processed. This embodiment illustrates an example case where m=4.

The 3rd accumulated value output unit 430 includes a plurality of 3rd accumulated value calculation units 431, 432, . . . , 446. Here, the number of the 3rd accumulated value calculation units 431, 432, . . . , 446 is n×m, i.e., 16.

As shown in FIG. 4, a plurality of row element value calculation units 411, 412, 413, 414, a plurality of 2nd accumulated value calculation units 421, 422, 423, 424, and a plurality of 3rd accumulated value calculation units 431, 432, . . . , 446 are formed as a whole in an overall two-dimensional systolic array.

When particularly classified by type in the overall two-dimensional systolic array of FIG. 4, the components thereof include the plurality of row element value calculation units 411, 412, 413, 414 that are formed in a one-dimensional systolic array, the plurality of 2nd accumulated value calculation units 421, 422, 423, 424 formed in a one-dimensional systolic array, and the plurality of 3rd accumulated value calculation units 431, 432, . . . , 446 that are formed in a two-dimensional systolic array.

However, when n=1 or m=1, the 3rd accumulated value calculation units 431, 432, . . . , 446 are formed in a one-dimensional systolic array.

The 2nd accumulated value output unit 420 is formed above the 3rd accumulated value output unit 430, and the element value calculation unit 410 is formed laterally of the 3rd accumulated value output unit 430. FIG. 4 illustrates the element value calculation unit 410 as being formed on the left side of the 3rd accumulated value output unit 430, although it may be formed on the right side of the 3rd accumulated value output unit 430 depending on embodiments.

The 2nd accumulated value calculation units 421, 422, 423, 424 accumulate second multiplication values obtained by multiplying each of the paired element values of the second matrix. Additionally, of the 2nd accumulated value calculation units 421, 422, 423, 424, those units 421, 422, and 423 except for the rightmost unit 424 select and output one of the outputs of their adjacent 2nd accumulated value calculation units 422, 423, and 424 and the second multiplication accumulated value, as a second accumulated value.

Additionally, the rightmost 2nd accumulated value calculation unit 424 outputs the second multiplication accumulated value to its left side 2nd accumulated value calculation unit 423.

Additionally, the 3rd accumulated value calculation units 431, 432, . . . , 446 each generate a first value obtained by adding one element value of the paired element values of the first matrix and one element value of the paired element values of the second matrix, generate a second value obtained by adding the other element value of the paired element values of the first matrix and the other element value of the paired element values of the second matrix and accumulate a third multiplication value obtained by multiplying the generated first value by the generated second value.

The 3rd accumulated value calculation units 431, 432, . . . , 446 save the rightmost 3rd accumulated value calculation units 434, 438, 442, 446, i. e., the remaining 3rd accumulated value calculation units 431, 432, . . . , 445 each select one of the third multiplication accumulated values and output values of their adjacent 3rd accumulated value calculation units 43, 432, . . . , 446 to generate the selected one as a third accumulated value.

The rightmost 3rd accumulated value calculation units 434, 438, 442, 446 respectively output the third multiplication accumulated values to their left side 3rd accumulated value calculation units 433, 437, 441, 445.

The row element value calculation units 411, 412, 413, 414 each accumulate a first matrix element multiplication value obtained by multiplying the paired element values of the first matrix by each other and subtract, from the third accumulated value, the first matrix element multiplication accumulated value and the second accumulated value, respectively to generate the third matrix element values.

Figure 5:
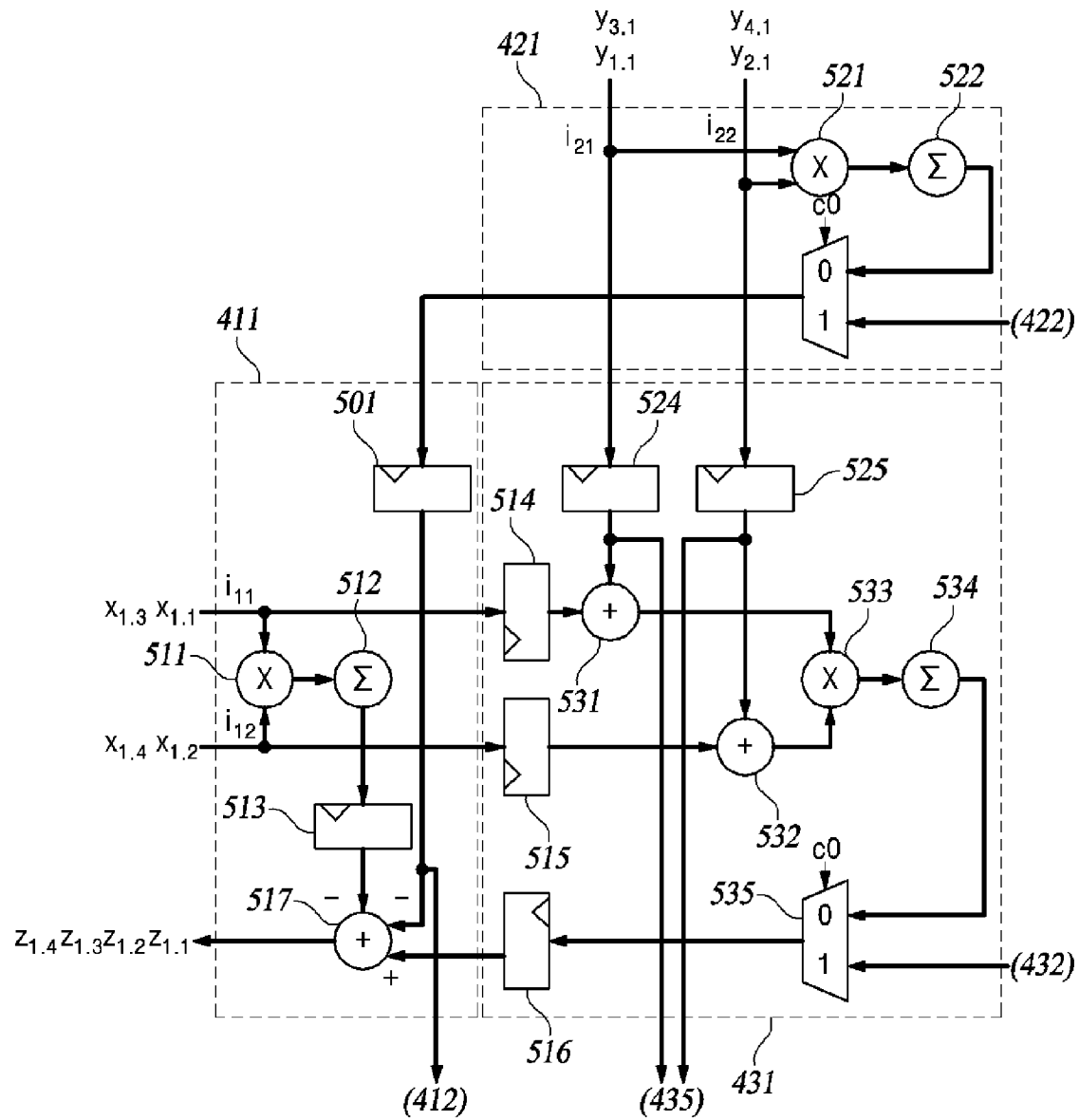
FIG. 5 is a diagram of the internal configurations of a first row element value calculation unit, leftmost 2nd accumulated value calculation unit, and upper-left 3rd accumulated value calculation unit.

FIG. 5 is a diagram of the internal configurations of the first row element value calculation unit 411, leftmost 2nd accumulated value calculation unit 421, and uppermost left 3rd accumulated value calculation unit 431.

Referring to FIGS. 4 and 5, the following describes operations of the first row element value calculation unit 411, leftmost 2nd accumulated value calculation unit 421, and uppermost left 3rd accumulated value calculation unit 431.

The element value calculation unit 411 includes a 2nd accumulated value storage unit 501, a first multiplication unit 511, a first accumulator 512, an 11th storage unit 513, and a first summing unit 517.

The element value calculation unit 411 accumulates the first matrix element multiplication value obtained by multiplying the paired element values of the first matrix by each other, and subtracts, from the third accumulated value generated by the 3rd accumulated value calculation unit 431 corresponding in position to the first row element value calculation unit 411, the first matrix element multiplication value and the second accumulated value accumulated by the first row element value calculation unit 411 and the second accumulated value, respectively to generate the third matrix element values.

The 2nd accumulated value storage unit 501 stores the second accumulated value received from the 2nd accumulated value output unit 420.

The first multiplication unit 511 receives paired matrix X element values of a first element value $x_{11}$ and a second element value $x_{12}$ at its input terminals $i_{11}$ and $i_{12}$, respectively. The first multiplication unit 511 multiplies the inputted $x_{11}$ and $x_{12}$ by each other to generate a first matrix element multiplication value a1. Additionally, upon receiving other paired matrix X element values of a third element value $x_{13}$ and a fourth element value $x_{14}$ at input terminals $i_{11}$ and $i_{12}$ respectively, the first multiplication unit 511 multiplies the inputted $x_{13}$ and $x_{14}$ by each other to generate another first matrix element multiplication value a2. As a note, in the present disclosure, the subscripts of the matrix element values may be expressed interchangeably, such as between $x_{ij}$ and $x_{i,j}$, and these two are used to convey the same meaning only with different expressions of the subscripts.

The first accumulator 512 sequentially accumulates the first matrix element multiplication values a1 and a2 generated by the first multiplication unit 511 to generate a first matrix element multiplication accumulated value.

If the number of columns of matrix X is 6 as in the case where the size of matrix X is 4×6, 6×6, and 8×6, multiplication is performed on yet other paired matrix X element values of a fifth element value $x_{15}$ and a sixth element value $x_{16}$ inputted to the input terminals $i_{11}$ and $i_{12}$ of the first multiplication unit 511, respectively, to generate yet another first matrix element multiplication value a3. In this case, the first accumulator 512 sequentially accumulates the first matrix element multiplication values a1, a2, and a3 generated by the first multiplication unit 511 to generate the first matrix element multiplication accumulated value.

The 11th storage unit 513 stores the first matrix element multiplication accumulated value generated by the first accumulator 512. The first matrix element multiplication accumulated value stored in the 11th storage unit 513 is used by the first summing unit 517 for calculating an element value for each row of matrix Z.

The first summing unit 517 subtracts from the third accumulated value stored in the 14th storage unit 516, the first matrix element multiplication accumulated value stored in the 11th storage unit 513 and the second accumulated value stored in the 2nd accumulated value storage unit 501, respectively to generate the third matrix Z element values.

As a side note, to allow the second accumulated value in the 2nd accumulated value storage unit 501 to be transmitted to the 2nd row element value calculation unit 412, a connecting line extends from a connecting cable between the 2nd accumulated value storage unit 501 and the first summing unit 517 to a 2nd accumulated value storage unit (not shown) of the 2nd row element value calculation unit 412 located below the first row element value calculation unit 411.

The 2nd row element value calculation unit 412 has the same components as those of the first row element value calculation unit 411. Upon receiving the matrix X element values required to calculate the element values of the Z matrix second row, the 2nd row element value calculation unit 412 utilizes the second accumulated value stored in the 2nd accumulated value storage unit (not shown) in the 2nd row element value calculation unit 412 and a third accumulated value received from its adjacent 3rd accumulated value calculation unit 435 to generate the element values of the Z matrix second row.

Although not shown here, there are a consecutive additional connection cable (not shown) formed for sequentially transmitting the second accumulated value to the 3rd row element value calculation unit 413 and the 4th row element value calculation unit 414.

The configurations and operations of the 2nd row element value calculation unit 412, 3rd row element value calculation unit 413, and 4th row element value calculation unit 414 are similar to those of the first row element value calculation unit 411, no further description is provided.

The leftmost 2nd accumulated value calculation unit 421 includes a 2nd multiplying unit 521, a 2nd accumulator 522, and a 2nd selection unit 523.

The leftmost 2nd accumulated value calculation unit 421 accumulates the second multiplication value obtained by multiplying each of the paired element values of the second matrix having been inputted, and selects and outputs one of the output value of the adjacent 2nd accumulated value calculation unit 422 and the accumulated second multiplication value, as a second accumulated value.

The 2nd multiplication unit 521 receives paired matrix Y element values of a first element value $y_{11}$ and a second element value $y_{21}$ at its input terminals $i_{21}$ and $i_{22}$, respectively, and multiplies the inputted $y_{11}$ and $y_{21}$ together to generate a second matrix element multiplication value b1. Additionally, upon receiving other paired matrix Y element values of a third element value $y_{31}$ and a fourth element value $y_{41}$ at its input terminals $i_{21}$ and $i_{22}$, respectively, the 2nd multiplication unit 521 multiplies the inputted $y_{31}$ and $y_{41}$ together to generate yet another second matrix element multiplication value b2.

The 2nd accumulator 522 sequentially accumulates the second matrix element multiplication values b1 and b2 generated by the 2nd multiplication unit 521 to generate a second matrix element multiplication accumulated value.

If the number of rows of matrix Y is 6 as in the case where the size of matrix Y is 6×4, 6×6, and 6×8, multiplication is performed on yet other paired matrix Y element values of a fifth element value $y_{51}$ and a sixth element value $y_{61}$ inputted to the input terminals $i_{21}$ and $i_{22}$ of the 2nd multiplication unit 521, respectively, to generate yet another second matrix element multiplication value b3. In this case, the 2nd accumulator 522 sequentially accumulates the second matrix element multiplication values b1, b2, and b3 generated by the 2nd multiplication unit 521 to generate the second matrix element multiplication accumulated value.

The 2nd selection unit 523 receives the second matrix element multiplication accumulated value generated by the 2nd accumulator 522 and a multiplication accumulated value from the adjacent 2nd accumulated value calculation unit 422, respectively, and selects and outputs, according to the value of a control input c0 to the 2nd selection unit 523, one of the same second matrix element multiplication accumulated value from the 2nd accumulator 522 and the same multiplication accumulated value received from the adjacent 2nd accumulated value calculation unit 422, as a second accumulated value that is stored in the 2nd accumulated value storage unit 501.

As a note, when the value of control input c0 is 0, the selected one is the second matrix element multiplication accumulated value generated by the 2nd accumulator 522, and when the value of control input c0 is 1, the selected one is the multiplication accumulated value received from the adjacent 2nd accumulated value calculation unit 422.

The uppermost left 3rd accumulated value calculation unit 431 includes a 12th storage unit 514, 13th storage unit 515, 14th storage unit 516, 21st storage unit 524, 22nd storage unit 525, 31st addition unit 531, 32nd addition unit 532, 3rd multiplication unit 533, 3rd accumulator 534, and 3rd selection unit 535.

The uppermost left 3rd accumulated value calculation unit 431 is adapted to generate the first value by adding one element value of the inputted paired element values of the first matrix and one element value of the inputted paired element values of the second matrix, to generate a second value by adding the other element value of the inputted paired element values of the first matrix and the other element value of the inputted paired element values of the second matrix, to accumulate a third multiplication value that is obtained by multiplying the first value by the second value, and to select and generate one of an output value of the adjacent 3rd accumulated value calculation unit 432 and the third multiplication accumulated value, as a third accumulated value.

The 12th storage unit 514 stores one of the paired matrix X element values, and the 13th storage unit 515 stores the other of the paired matrix X element values. For example, when $x_{11}$ and $x_{12}$ are inputted as the paired matrix X element values to their input terminals $i_{11}$ and $i_{12}$, respectively, the 12th storage unit 514 stores one element value $x_{11}$, and the 13th storage unit 515 stores the other element value $x_{12}$.

The 14th storage unit 516 receives and stores the third accumulated value from the 3rd selection unit 535. Here, the third accumulated value is selected by any one of 3rd selection units (not shown) of the 3rd accumulated value calculation units 432, 433, and 434 existing in the same row as the uppermost left 3rd accumulated value calculation unit 431 and the 3rd selection unit 535 of the uppermost left 3rd accumulated value calculation unit 431 and that is sequentially transferred to the left until the 3rd selection unit 535 outputs the same to be stored in the 14th storage unit 516.

The 21st storage unit 524 stores one of the paired matrix Y element values, and the 22nd storage unit 525 stores the other of the paired matrix Y element values. For example, when $y_{11}$ and $y_{21}$ are inputted as the paired matrix Y element values, the 21st storage unit 524 stores one element value $y_{11}$, and the 22nd storage unit 525 stores the other element value $y_{21}$.

Meanwhile, the data respectively stored in the 21st storage unit 524 and the 22nd storage unit 525 are outputted downward to the lower adjacent 3rd accumulated value calculation unit 435 at its 21st storage unit (not shown) and its 22nd storage unit (not shown), respectively.

The 31st addition unit 531 receives one matrix X element value from the 12th storage unit 514, receives one matrix Y element value from the 21st storage unit 524, and adds the one matrix X element value and one matrix Y element to each other to generate the first value.

The 32nd addition unit 532 receives another matrix X element value from the 13th storage unit 515, receives another matrix Y element value from the 22nd storage unit 525, and adds the another matrix X element value and another matrix Y element value to each other to generate a second value.

The 3rd multiplication unit 533 multiplies the first value generated by the 31st addition unit 531 and the second value generated by the 32nd addition unit 532 by each other to generate a third multiplication value.

The 3rd accumulator 534 accumulates the third multiplication value generated by the 3rd multiplication unit 533.

The 3rd selection unit 535 receives the third multiplication accumulated value generated by the 3rd accumulator 534 and a multiplication accumulated value from the adjacent 3rd accumulated value calculation unit 432, respectively, and selects and outputs, according to the value of control input c0 to the 3rd selection unit 535, one of the same third matrix element multiplication accumulated value from the 3rd accumulator 534 and the same a multiplication accumulated value received from the adjacent 2nd accumulated value calculation unit 422, as a third accumulated value. The third accumulated value outputted from the 3rd selection unit 535 is stored in the 14th storage unit 516.

Meanwhile, the 3rd selection unit 535 makes its selection to output the third accumulated value subject to the same control input c0 as the one inputted to the 2nd selection unit 523 of the uppermost left 3rd accumulated value calculation unit 431 existing on the systolic array in the same column as the leftmost 2nd accumulated value calculation unit 421.

Figure 6:
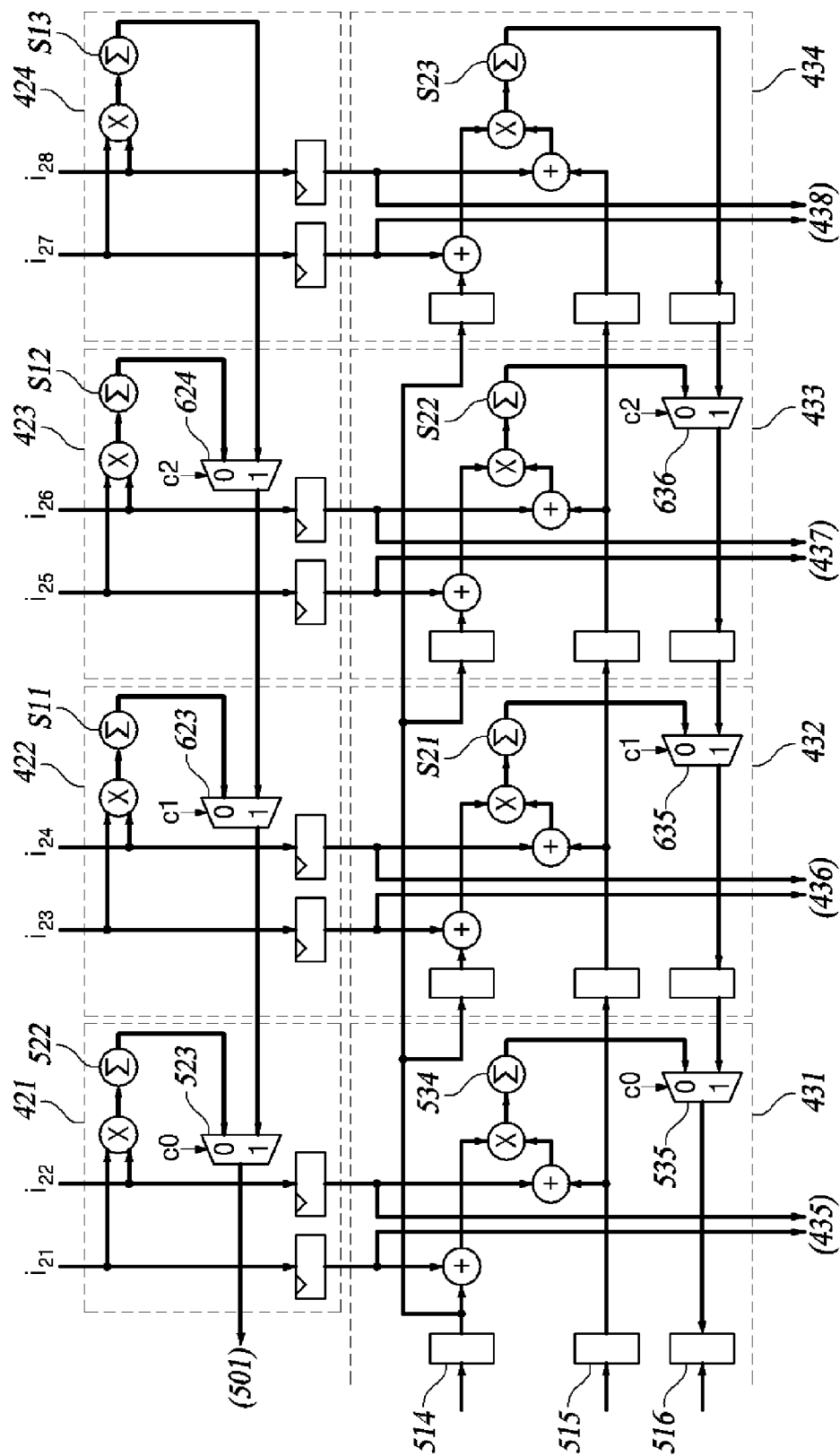
FIG. 6 is a diagram illustrating in detail the configurations of 2nd accumulated value calculation units and uppermost 3rd accumulated value calculation units, wherein the reference numerals indicate only some requisite components for description with the other remaining components being unnumbered.

FIG. 6 is a diagram illustrating in detail the configurations of the 2nd accumulated value calculation units 421, 422, 423, 424 and the uppermost 3rd accumulated value calculation units 431, 432, 433, 434, wherein the reference numerals indicate only some requisite components for description with the other remaining components being unnumbered.

Taking account of the above description of the operations of the leftmost 2nd accumulated value calculation unit 421 and the uppermost left 3rd accumulated value calculation unit 431, no further description of the operations of the remaining 2nd accumulated value calculation units 422, 423, 424 and the remaining 3rd accumulated value calculation units 432, 433, and 434 is provided. Instead described the data selection operations of 2nd selection units 523, 623, 624 and 3rd selection units 535, 635, and 636 critically.

In FIG. 6, when control input c0 is 0, it causes the 2nd selection unit 523 to select and output the multiplication accumulated value generated by the 2nd accumulator 522 of the 2nd accumulated value calculation unit 421 to the 2nd accumulated value storage unit 501. That control input also causes the 3rd selection unit 535 to select and output the multiplication accumulated value generated by the 3rd accumulator 534 of the 3rd accumulated value calculation unit 431 to the 14th storage unit 516.

When the value of c0 is 1, it causes the 2nd selection unit 523 to select and output the multiplication accumulated value outputted from the 2nd selection unit 623 of the 2nd accumulated value calculation unit 422 to the 2nd accumulated value storage unit 501. The same control input also causes the 3rd selection unit 535 to select and output the multiplication accumulated value generated by a 3rd accumulator S21 of the 3rd accumulated value calculation unit 432 to the 14th storage unit 516.

When the value of c1 is 0, it causes the 2nd selection unit 623 to select and input the multiplication accumulated value generated by a 2nd accumulator S11 of the 2nd accumulated value calculation unit 422 to the 2nd accumulated value calculation unit 421 at the 2nd selection unit 523. The same c1 value causes a 3rd selection unit 635 of the 3rd accumulated value calculation unit 432 to select and input the multiplication accumulated value generated by the 3rd accumulator S21 of the 3rd accumulated value calculation unit 432 to the 3rd accumulated value calculation unit 431 at the 3rd selection unit 535.

When the c1 value is 1, it causes the 2nd selection unit 624 of the 2nd accumulated value calculation unit 422 to select and input the multiplication accumulated value outputted from the 2nd selection unit 624 of the 2nd accumulated value calculation unit 423 to the 2nd accumulated value calculation unit 421 at the 2nd selection unit 523, and it causes the 3rd selection unit 635 to select and input the multiplication accumulated value generated by a 3rd accumulator S22 of the 3rd accumulated value calculation unit 433 to the 3rd accumulated value calculation unit 431 at the 3rd selection unit 535.

When the c2 value is 0, it causes the 2nd selection unit 624 to select and input the multiplication accumulated value generated by a 2nd accumulator S12 of the 2nd accumulated value calculation unit 423 to the 2nd accumulated value calculation unit 422 at the 2nd selection unit 623, and it causes the 3rd selection unit 636 to select and input the multiplication accumulated value generated by the 3rd accumulator S22 of the 3rd accumulated value calculation unit 433 to the 3rd accumulated value calculation unit 432 at the 3rd selection unit 635.

When the c2 value is 1, it causes the 2nd selection unit 624 to select and input the multiplication accumulated value generated by a 2nd accumulator S13 of the 2nd accumulated value calculation unit 424 to the 2nd accumulated value calculation unit 422 at the 2nd selection unit 623, and it causes the 3rd selection unit 636 to select and input the multiplication accumulated value generated by a 3rd accumulator S23 of the 3rd accumulated value calculation unit 434 to the 3rd accumulated value calculation unit 432 at the 3rd selection unit 635.

Table 1 shows the reference numerals of the components that output, subject to the selection operation based on the control input values c0, c1, c2, the accumulated values for the first row element value calculation unit 411 to generate the matrix Z element values.

TABLE 1

| c0 | c1 | c2 | Components by Ref. Numerals Subject To Selection Operation |
|---|---|---|---|
| 0 | x | x | 522, 534 |
| 1 | 0 | x | S11, S21 |
|   | 1 | 0 | S12, S22 |
|   |   | 1 | S13, S23 |

As Table 1 shows, when c0=0, with no reference to the c1 and c2 values, the multiplication accumulated value generated by the 2nd accumulator 522 of the 2nd accumulated value calculation unit 421 is selected and outputted by the 2nd selection unit 523 to the 2nd accumulated value storage unit 501, and the multiplication accumulated value generated by the 3rd accumulator 534 of the 3rd accumulated value calculation unit 431 is selected and outputted by the 3rd selection unit 535 to the 14th storage unit 516.

When c0=1 and c1=0, with no reference to the c2 value, the multiplication accumulated value generated by the 2nd accumulator S11 of the 2nd accumulated value calculation unit 422 is selected and outputted sequentially by the 2nd selection unit 623 and the 2nd selection unit 523 to the 2nd accumulated value storage unit 501, and the multiplication accumulated value generated by the 3rd accumulator S21 of the 3rd accumulated value calculation unit 432 is selected and outputted sequentially by the 3rd selection unit 635 and the 3rd selection unit 535 to the 14th storage unit 516.

When c0=c1=1 and c2=0, the multiplication accumulated value generated by the 2nd accumulator S12 of the 2nd accumulated value calculation unit 423 is selected and outputted sequentially by the 2nd selection unit 624, the 2nd selection unit 623, and the 2nd selection unit 523, and the multiplication accumulated value generated by the 3rd accumulator S22 of the 3rd accumulated value calculation unit 433 is selected and outputted sequentially by the 3rd selection unit 636, the 3rd selection unit 635, and the 3rd selection unit 535 to the 14th storage unit 516.

When c0=c1=c2=1, the multiplication accumulated value generated by the 2nd accumulator S13 of the 2nd accumulated value calculation unit 424 is selected and outputted sequentially by the 2nd selection unit 624, the 2nd selection unit 623, and the 2nd selection unit 523 to the 2nd accumulated value storage unit 501, and the multiplication accumulated value generated by the 3rd accumulator S23 of the 3rd accumulated value calculation unit 434 is selected and outputted sequentially by the 3rd selection unit 636, the 2nd selection unit 635, and the 2nd selection unit 52 to the 14th storage unit 516.

Accordingly, the first row element value calculation unit 411 is responsive to the control input values c0, c1, c2 for receiving the corresponding third and second accumulated values sequentially to generate the matrix Z element values 211, 212, 213, and 214 sequentially.

Since the operation of the first row element value calculation unit 411 is similar to that of the remaining row element value calculation units 412, 413, and 414, no further description about the process performed by the remaining row element value calculation units 412, 413, and 414 for generating the matrix Z element values is provided.

Meanwhile, in FIG. 5, the seven storage units 501, 513, 514, 515, 516, 524, 525 may be implemented as, but are not limited to, flip-flops, respectively, and the 2nd selection unit 523 and the 3rd selection unit 535 may be implemented as, but are not limited to, multiplexers. Meanwhile, since the operations of the flip-flop and the multiplexer are obvious to those skilled in the art, no further description is provided.

As described above, the operation apparatus 400 according to at least one embodiment of the present disclosure is implemented so that the 3rd accumulated value calculation units 431, 432, . . . , 446 thereof having a 2-dimensional systolic array involve no subtraction operation needed for calculating the matrix Z element values. Instead, a subtraction operation circuit for calculating the matrix Z element values is designed like the first summing unit 517 to be in each of the row element value calculation units 411, 412, 413, 414.

Arranged in a two-dimensional array, the 3rd accumulated value calculation units 431, 432, . . . , 446 are each provided with a single hardware element for carrying out a selection operation in place of the typical hardware requisite for carrying out the (−) operation twice and instead, a (−) operation circuit is provided to each of the row element value calculation units 411, 412, 413, 414 having a one-dimensional structure, resulting in a reduced overall hardware design area of the operation apparatus of the present disclosure in FIG. 4 compared to the conventional overall hardware design area in FIG. 2.

Additionally, the 2nd accumulated value output unit 420 and the 3rd accumulated value output unit 430 have no data path therebetween for transmission of the second accumulated value, which is a minuend generated by the 2nd accumulated value output unit 420. Instead, an additional data path is formed in the 2nd accumulated value output unit 420 from the right toward the left thereof and in the element value calculation unit 410 from the top toward the bottom thereof.

In this way, the present disclosure routes the second accumulated value, a minuend generated by the 2nd accumulated value output unit 420 to run by way of the 2nd accumulated value output unit 420 and the element value calculation unit 410 having a one-dimensional systolic array, which significantly reduces the number of transmission paths of the second accumulated value, the minuend compared to the operation apparatus 200 of FIG. 2. Accordingly, in carrying out the matrix multiplication by using the Winograd algorithm, the operation apparatus 400 of FIG. 4 can perform at a higher speed than the conventional operation apparatus 200 of FIG. 2.

Accordingly, the present disclosure has a significant effect in economic terms thanks to a reduced hardware footprint as well as in terms of quickness thanks to an increased operating speed.

In designing the operation apparatus 400 according to at least one embodiment of the present disclosure, it can be implemented to support multiple precision, that is, multiple bit lengths.

The operation apparatus 400 is designed to support multiple precision by allowing the 31st addition unit 531, 32nd addition unit 532, 3rd multiplication unit 533, and 3rd accumulator 534 in the 3rd accumulated value calculation unit 431 to each function common to inputs of different bit lengths.

When performing matrix multiplications in a plurality of precisions, hardware cost can be greatly reduced by the operation apparatus for matrix multiplication when it is implemented to support operations on input data of different precisions in addition to one precision of input data.

Although this embodiment describes a case of supporting both 8-bit precision and 16-bit precision input data, it applies to various cases such as simultaneous support of 16-bit precision and 32-bit precision input data.

There are two possible approaches to the hardware design of matrix multiplication devices that support multiple precision. One way is based on a hardware operator supporting low precision to process high-precision data over multiple cycles, and the other way is conversely based on a hardware operator supporting high precision to process multiple low-precision data in a cycle.

The one way is first described, which is based on a hardware operator supporting low precision to process high-precision data over multiple cycles.

With the Winograd algorithm, 8-bit integer matrix data when inputted needs a 9-bit integer multiplication, and 16-bit integer matrix data when inputted needs a 17-bit integer multiplication. The 17-bit integer multiplication may be performed by using a 9-bit integer multiplication unit 4 times.

Figure 7:
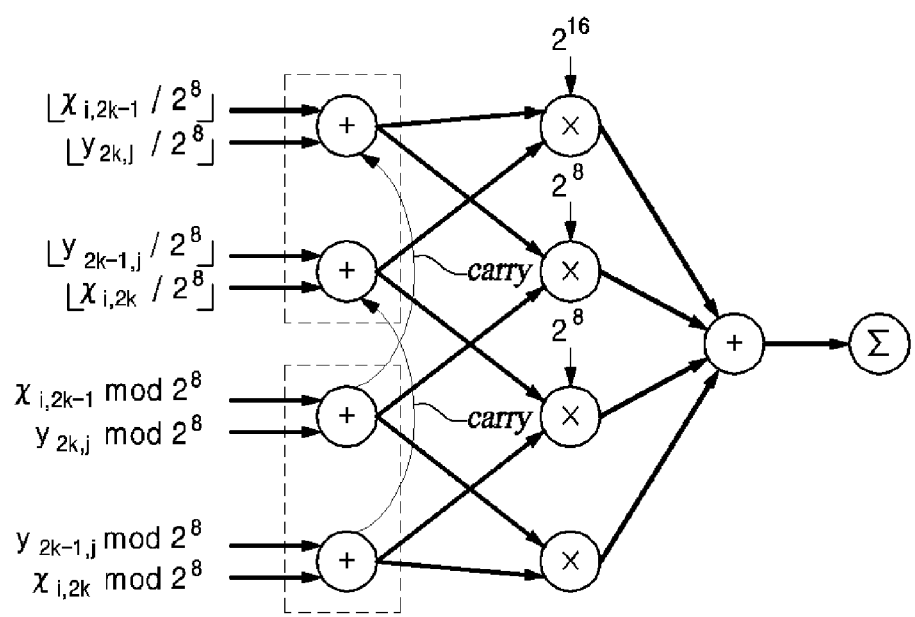
FIG. 7 is a data flow diagram of a sum-product operation method according to at least one embodiment of the present disclosure, in particular, the function of the 3rd accumulated value calculation unit with the function of a 3rd selection unit excluded.

FIG. 7 is a data flow diagram of a sum-product operation method according to at least one embodiment, in particular, the functions of the 31st addition unit 531, 32nd addition unit 532, 3rd multiplication unit 533, and 3rd accumulator 534 of the 3rd accumulated value calculation unit 431.

As a note, the carry of FIG. 7 indicates a bit indicating whether or not a rounding occurs in the most significant digit when performing an addition operation. For example, the present disclosure may be implemented to value the carry as 1 when rounding occurs in the most significant digit, whereas value the carry as 0 when no rounding occurs in the most significant digit.

Figure 8:
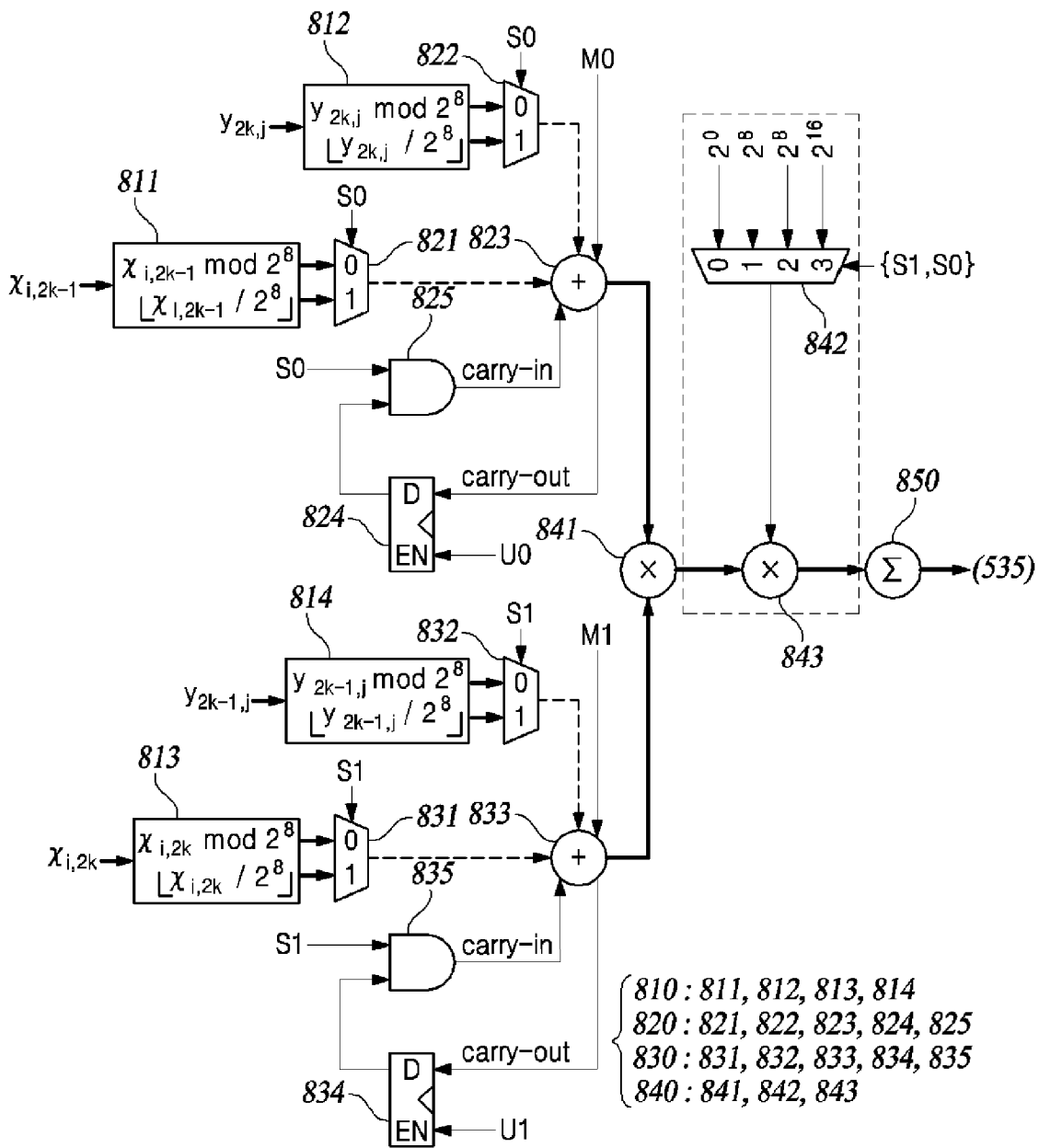
FIG. 8 is a diagram of a sum-product operation apparatus according to at least one embodiment and implementing the data flow diagram of FIG. 7.

FIG. 8 is a diagram of a sum-product operation apparatus 800 according to at least one embodiment and implementing the data flow diagram of FIG. 7.

In FIG. 8, the sum-product operation apparatus 800 according to at least one embodiment includes an input division unit 810, a first addition unit 820, a 2nd addition unit 830, a multiplication unit 840, and an accumulator 850. The 3rd accumulated value calculation units 431, 432, 433, and 434 may be implemented by including the sum-product operation apparatus 800 according to at least one embodiment.

As illustrated, the sum-product operation apparatus 800 according to at least one embodiment of the present disclosure has the first addition unit 820 and 2nd addition unit 830, which are otherwise limited to providing a summation operation on matrix element inputs in units of up to N bits but not 2N bits, expanded to handle a summation operation on the matrix element inputs in units of 2N bits. The following illustrates the case where N=8.

The input division unit 810 includes an 11th processor 811, a 12th processor 812, a 21st processor 813, and a 22nd processor 814.

The first addition unit 820 includes an 11th selection unit 821, a 12th selection unit 822, an 11th addition unit 823, a first carry storage unit 824, and a first carry input unit 825.

The 2nd addition unit 830 includes a 21st selection unit 831, a 22nd selection unit 832, a 21st addition unit 833, a 2nd carry storage unit 834, and a 2nd carry input unit 835.

The multiplication unit 840 includes a sum multiplication unit 841, a multiplier selection unit 842, and a multiplier multiplication unit 843.

In FIG. 8, the 11th processing unit 811 divides and outputs a first input $x_{i,2k-1}$, which is a 2N-bit (i.e., 16-bit) long X matrix element, into a high-order or upper N-bit divided bitmap $\lfloor x_{i,2k-1}/2^8 \rfloor$ and a low-order or lower N-bit divided bitmap $x_{i,2k-1} \bmod 2^8$ to the 11th selection unit 821.

The 12th processing unit 812 divides and outputs a second input $y_{2k,j}$, which is a 2N-bit long Y matrix element, into an upper N-bit divided bitmap $\lfloor y_{2k,j}/2^8 \rfloor$ and a lower N-bit divided bitmap $y_{2k,j} \bmod 2^8$ to the 12th selection unit 822.

The 11th selection unit 821 receives and selectively outputs the upper divided bitmap $\lfloor x_{i,2k-1}/2^8 \rfloor$ and the lower divided bitmap $x_{i,2k-1} \bmod 2^8$ for $x_{i,2k-1}$, respectively, according to the value of S0. For example, the 11th selection unit 821 is responsive to when S0=0 for outputting the lower divided bitmap $x_{i,2k-1} \bmod 2^8$ and is responsive to when S0=1 for outputting the upper divided bitmap $\lfloor x_{i,2k-1}/2^8 \rfloor$, and it inputs the output to the 11th addition unit 823.

The 12th selection unit 822 performs selections of one first matrix element value and one second matrix element value each by each of selected divided bitmaps that are of equal rank between the upper divided bitmap and the lower divided bitmap. In particular, the 12th selection unit 822 receives and selectively outputs the upper divided bitmap $\lfloor y_{2k,j}/2^8 \rfloor$ and the lower divided bitmap $y_{2k,j} \bmod 2^8$ of $y_{2k,j}$, respectively, according to the value of S0. For example, the 12th selection unit 822 is responsive to when S0=0 for outputting the lower divided bitmap $y_{2k,j} \bmod 2^8$ and is responsive to when S0=1 for outputting the upper divided bitmap $\lfloor y_{2k,j}/2^8 \rfloor$ and it inputs the output to the 11th addition unit 823.

The 11th addition unit 823 receives and adds the output of the 11th selection unit 821 and the output of the 12th selection unit 822 to generate their added value. Here, the 11th addition unit 823 receives, from the 11th selection unit 821 and the 12th selection unit 822, the selection values for each of divided bitmaps that are of equal rank between the upper divided bitmap and the lower divided bitmap.

The 21st processing unit 813 divides and outputs a third input $x_{i,2k}$, which is a 2N-bit long other X matrix element, into an upper N-bit divided bitmap $\lfloor x_{i,2k}/2^8 \rfloor$ and a lower N-bit divided bitmap $x_{i,2k} \bmod 2^8$ to the 21st selection unit 831.

The 22nd processing unit 814 divides and outputs a fourth input $y_{2k-1,j}$, which is a 2N-bit long other Y matrix element, into an upper N-bit divided bitmap $\lfloor y_{2k-1,j}/2^8 \rfloor$ and a lower N-bit divided bitmap $y_{2k-1,j} \bmod 2^8$ to the 22nd selection unit 832.

The 21st selection unit 831 receives and selectively outputs the upper divided bitmap $\lfloor x_{i,2k}/2^8 \rfloor$ and the lower divided bitmap $x_{i,2k} \bmod 2^8$ for $x_{i,2k}$, respectively, according to the value of S1. For example, the 21st selection unit 831 is responsive to when S1=0 for outputting the lower divided bitmap $x_{i,2k}$ mod $2^8$ and is responsive to when S1=1 for outputting the upper divided bitmap $\lfloor x_{i,2k}/2^8 \rfloor$, and it inputs the output to the 21st addition unit 833.

The 22nd selection unit 832 receives and selectively outputs the upper divided bitmap $\lfloor y_{2k-1,j}/2^8 \rfloor$ and the lower divided bitmap $y_{2k-1,j}$ mod $2^8$ of $y_{2k-1,j}$, respectively, according to the value of S1. For example, the 22nd selection unit 832 is responsive to when S1=0 for outputting the lower divided bitmap $y_{2k-1,j}$ mod $2^8$, and is responsive to when S1=1 for outputting the upper divided bitmap $\lfloor y_{2k-1,j}/2^8 \rfloor$, and it inputs the output to the 22nd addition unit 833.

The 21st addition unit 833 receives and adds the output of the 21st selection unit 831 and the output of the 22nd selection unit 832 to generate their added value. Here, the 21st addition unit 833 receives, from the 21st selection unit 831 and the 22nd selection unit 832, the selection values for each of divided bitmaps that are of equal rank between the upper divided bitmap and the lower divided bitmap, respectively.

The sum multiplication unit 841 multiplies the addition result from the 11th addition unit 823 by the addition result from the 21st addition unit 833 to generate a multiplication result.

The multiplier selection unit 842 selects a multiplier corresponding to the addition result of the 11th addition unit 823 and the addition result of the 21st addition unit 833.

The multiplier multiplication unit 843 multiplies the generated multiplication from multiplying the addition result of the 11th addition unit 823 and the addition result of the 21st addition unit 833 together, by the selected multiplier from the multiplier selection unit 842 to generate a second multiplication value.

The accumulator 850 accumulates the second multiplication value generated by the multiplier multiplication unit 843.

A M0/M1 value is determined according to whether the respective addition units, e.g., 11th addition unit 823 and 21st addition unit 833 operate as (N+1)-bit integer addition units or N-bit positive addition units. For example, when the respective addition units, e.g., 11th addition unit 823 and 21st addition unit 833 need to operate as (N+1)-bit integer addition units, that is, operate in an (N+1)-bit integer addition unit mode, the M0/M1 value is set to 0, and when the respective addition units, e.g., 11th addition unit 823 and 21st addition unit 833 need to operate as the N-bit positive addition units, the M0/M1 value is set to 1.

In the case that the M0/M1 value is 0, which means respective addition units, e.g., 11th addition unit 823 and 21st addition unit 833 operate in the (N+1)-bit integer addition unit mode, they generate an N-bit output value and a carry resulting from the sum of the N-bit input values and input the generated N-bit output value and the sign value F to the sum multiplication unit 841. Here, the sign value inputted to the sum multiplication unit 841 refers to the result value from performing an XOR operation by an XOR operator on three input values, which is generated in the form of sign value F of the (N+1) bit output as shown in Table 2 below. Here, the three input values refer to signs A and B of two input values to any relevant one of the addition units, e.g., 11th addition unit 823 and 21st addition unit 833 and a carry C generated as a result of the 8-bit addition operation of the relevant one of the addition units, e.g., 11th addition unit 823 and 21st addition unit 833.

TABLE 2

| A | B | C | F |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

In the case that the M0/M1 value is 1, which means the respective addition units, e.g., 11th addition unit 823 and 21st addition unit 833 operate in the N-bit positive addition unit mode, they generate an N-bit output value and a carry resulting from the sum of the N-bit input values.

In the case that the respective addition units, e.g., 11th addition unit 823 and 21st addition unit 833 perform the addition of the lower N bits, which means the U0/U1 value is 1, they store thus generated carries in such storage as flip-flops, respectively and subsequently utilize the carries as the carry inputs to the addition units themselves when they are subject to S0/S1=1.

FIG. 8 shows flag values such as S0/S1, M0/M1, and U0/U1 which are determined according to the precision of the respective addition units, e.g., 11th addition unit 823 and 21st addition unit 833 and the multiplication processing cycle. The flag values S0/S1, M0/M1, and U0/U1 may be set as shown in Table 3.

The settings of S0/S1, M0/M1, and U0/U1 values are not limited to those shown in Table 3 and may be set differently according to embodiments.

TABLE 3

| When Inputting N-bit Precision | N-bit Operation Processing Cycle When Inputting 2N-bit Precision Data | | | |
|---|---|---|---|---|
| Data | 1 | 2 | 3 | 4 |
| S0 | 0 | 0 | 0 | 1 | 1 |
| S1 | 0 | 0 | 1 | 0 | 1 |
| M0 | 0 | 1 | 1 | 0 | 0 |
| M1 | 0 | 1 | 0 | 1 | 0 |
| U0 | 0 | 1 | 0 | 0 | 0 |
| U0 | 0 | 1 | 0 | 0 | 0 |

Figure 9:
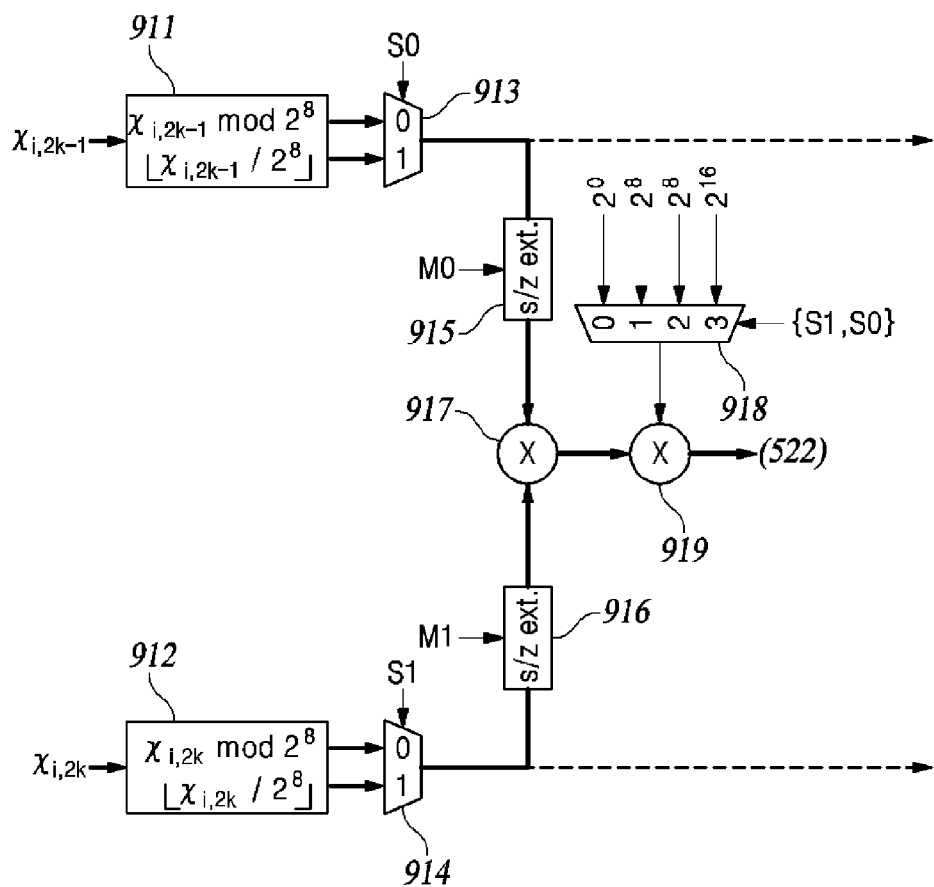
FIG. 9 is a diagram of a configuration of a multiplication device replacing a first multiplication unit or a 2nd multiplication unit of FIG. 5 for performing multiplication on two 16-bit input data items after being divided in 8-bit units.

FIG. 9 is a diagram of the configuration of a multiplication device replacing the first multiplication unit 511 or 2nd multiplication unit 521 of FIG. 5 for performing multiplication on two 2N-bit input data items after being divided in N-bit units.

As shown in FIG. 9, the multiplication device 900 according to a first embodiment includes a first input division unit 911, 2nd input division unit 912, first selection unit 913, 2nd selection unit 914, first sign extension unit 915, 2nd sign extension unit 916, first multiplication unit 917, multiplier selection unit 918, and multiplier multiplication unit 919.

The following describes a case where the multiplication device 900 according to the first embodiment is employed as the first multiplication unit 511.

As illustrated, the multiplication device 900 according to this embodiment has the first multiplication unit 917, which is otherwise limited to providing a multiplication operation on matrix element inputs in units of up to N bits but not 2N bits, expanded to handle multiplication on the matrix element inputs in units of 2N bits. The following illustrates the case where N=8.

Hereinafter, the operation of the multiplication device 900 according to the first embodiment will be described referring to FIG. 5 and FIG. 9 together.

The first input division unit 911 divides and outputs a first input $x_{i,2k-1}$, which is a 2N-bit long X matrix element, into an upper N-bit divided bitmap $\lfloor x_{i,2k-1}/2^8 \rfloor$ and a lower N-bit divided bitmap $x_{i,2k-1} \bmod 2^8$ to the first selection unit 913.

The 2nd input division unit 912 divides and outputs a second input $x_{i,2k}$, which is another 2N-bit long X matrix element, into an upper N-bit divided bitmap $\lfloor x_{i,2k}/2^8 \rfloor$ and a lower N-bit divided bitmap $x_{i,2k} \bmod 2^8$ to the 2nd selection unit 914.

The first selection unit 913 receives and selectively outputs the upper divided bitmap and the lower divided bitmap of $x_{i,2k-1}$ from the first input division unit 911, respectively, according to the value of S0. For example, in the case of S0=0, the first selection unit 913 outputs the lower divided bitmap and in the case of S0=1, it outputs the upper divided bitmap, and it inputs the output to the first sign extension unit 915.

The 2nd selection unit 914 receives and selectively outputs the upper divided bitmap and the lower divided bitmap of $x_{i,2kj}$, respectively, upon receiving the control input of the S1 value. For example, in the case of S1=0, the 2nd selection unit 914 outputs the lower divided bitmap and in the case of S1=1, it outputs the upper divided bitmap, and it inputs the output to the 2nd code extension unit 916.

In the case of M0=0, the first sign extension unit 915 adds the sign value of the N-bit upper divided bitmap inputted to the first sign extension unit 915 to the front of the N-bit upper divided bitmap and thereby generates and inputs (N+1) bit data in the form of [upper divided bitmap sign value, N-bit upper divided bitmap] to the first multiplication unit 917. In the case of M0=1, the first sign extension unit 915 generates and inputs (N+1)-bit data in the form of [0, N-bit upper divided bitmap] to the first multiplication unit 917.

In the case of M1=0, the 2nd sign extension unit 916 adds the sign value of the N-bit upper divided bitmap inputted to the 2nd sign extension unit 916 to the front of the N-bit upper divided bitmap and thereby generates and inputs (N+1) bit data in the form of [upper divided bitmap sign value, N-bit upper divided bitmap] to the first multiplication unit 917. In the case of M1=1, the 2nd sign extension unit 916 generates and inputs (N+1)-bit data in the form of [0, N-bit upper divided bitmap] to the first multiplication unit 917.

The first multiplication unit 917 multiplies the (N+1) bit data received from the first sign extension unit 915 by the (N+1) bit data received from the 2nd sign extension unit 916 to generate a multiplication result.

The multiplier selection unit 918 selects a multiplier corresponding to the (N+1) bit data received from the first sign extension unit 915 and the (N+1) bit data received from the 2nd sign extension unit 916. For example, the multiplier selection unit 918 selects, as the multiplier, 1 in the case of $\{S0, S1\}=\{0, 0\}$, $2^8$ in the case of $\{S0, S1\}=\{0, 1\}$, $2^8$ in the case of $\{S0, S1\}=\{1, 0\}$, and $2^{16}$ in the case of $\{S0, S1\}=\{1, 1\}$, respectively.

The multiplier multiplication unit 919 multiplies the multiplication result, which is obtained by multiplying the (N+1) bit data received from the first sign extension unit 915 by the (N+1) bit data received from the 2nd sign extension unit 916, by the multiplier selected by the multiplier selection unit 918 to generate and transmit a first multiplication value to the 2nd accumulator 522.

Meanwhile, the multiplication device 900 according to the first embodiment is employed as the 2nd multiplication unit 521, wherein the input matrix Y element values inputted to the first input division unit 911 and the 2nd input division unit 912 may follow suit the operational procedure of the input matrix X element values after being inputted to the first input division unit 911 and the 2nd input division unit 912, and thus no further description is provided.

Figure 10:
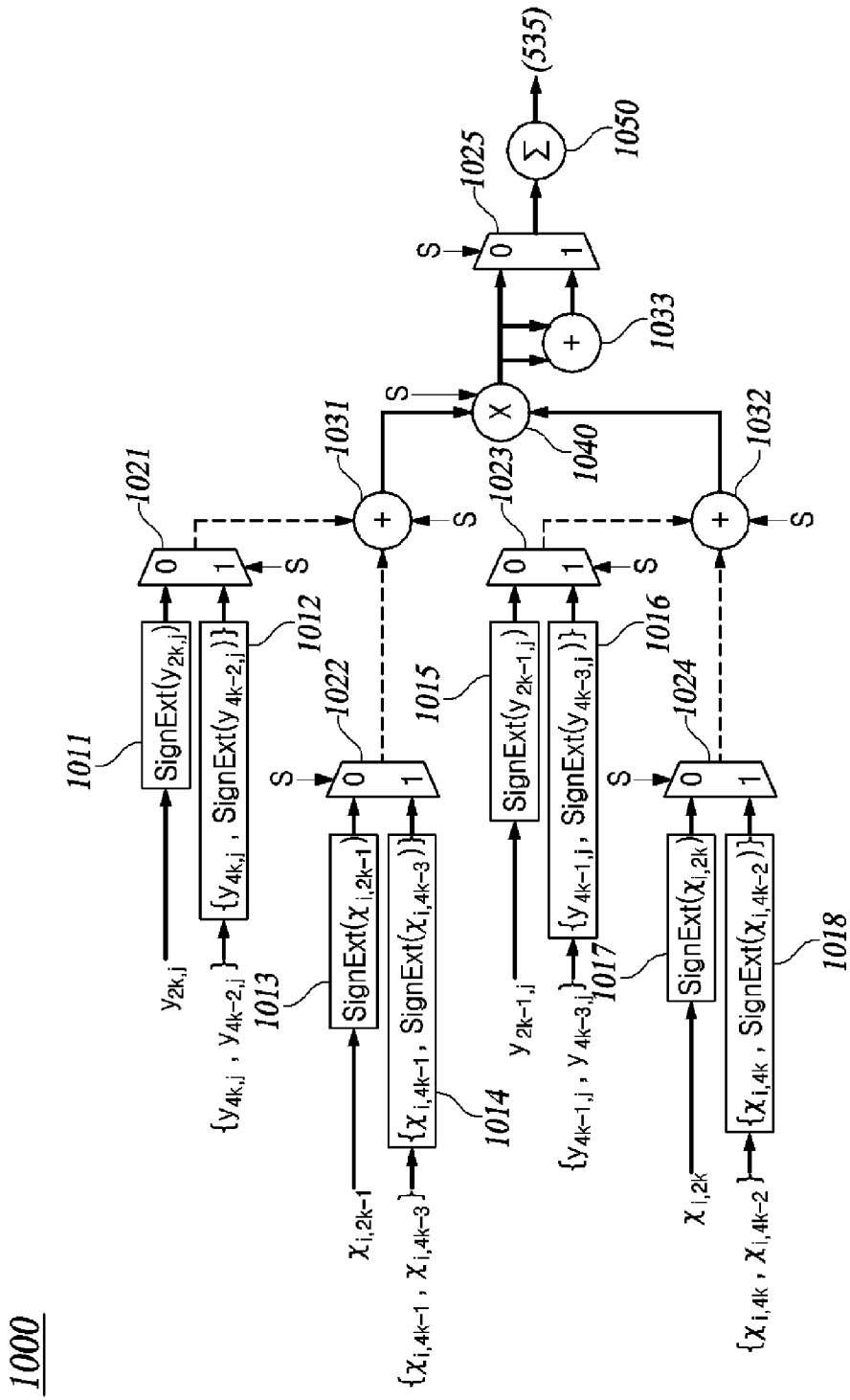
FIG. 10 is a diagram of a sum-product operation apparatus according to at least one embodiment as an apparatus needed for calculating matrix multiplication by merging a plurality of matrix element values into a single data.

FIG. 10 is a diagram illustrating a sum-product operation apparatus 1000 according to at least one embodiment as an apparatus needed for calculating matrix multiplication by merging a plurality of matrix element values into a single data. FIG. 10 is another embodiment implementing the functions of the 31st addition unit 531, 32nd addition unit 532, 3rd multiplication unit 533, and 3rd accumulator 534 of the 3rd accumulated value calculation unit 431.

Figure 11:
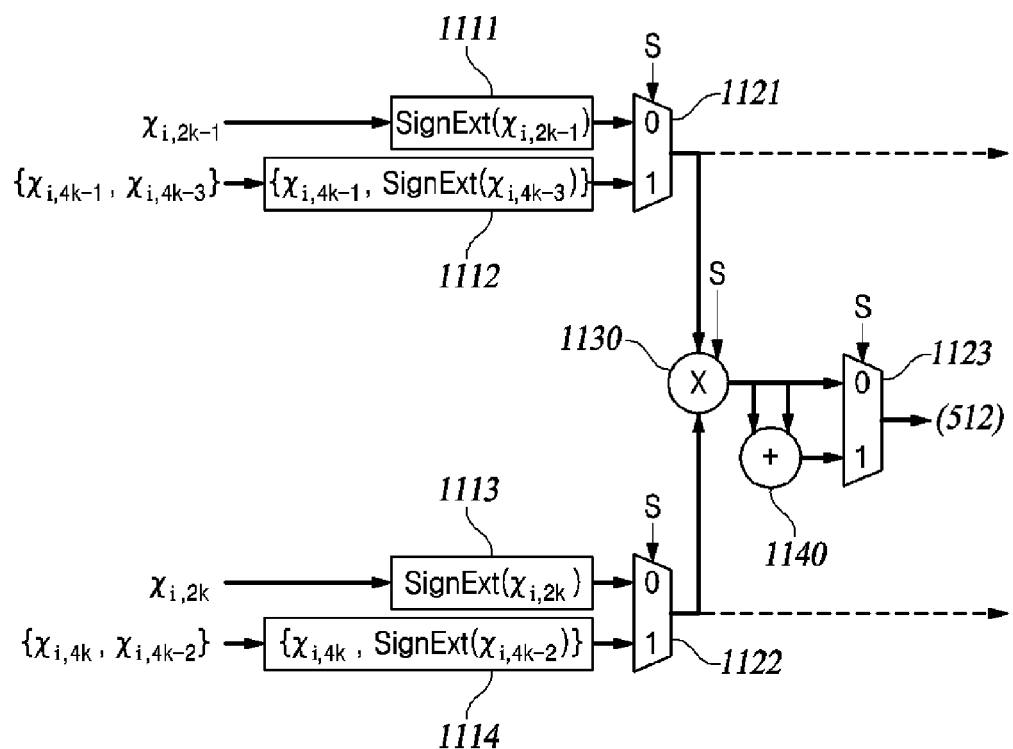
FIG. 11 is a diagram of an operation apparatus that can be used for first multiplication units of row element value calculation units and 2nd multiplication units of respective 2nd accumulated value calculation units.

The following describes, referring to FIGS. 10 and 11, the other way of designing matrix multiplication devices that support multiple precision, based on a hardware operator supporting high precision to process multiple low-precision data items in one cycle. This embodiment describes a design method for processing 4 pairs of N-bit matrix elements at a time by extending a hardware unit that processes 2 pairs of 2N-bit matrix elements at a time by using the Winograd algorithm.

In FIG. 10, the sum-product operation apparatus 1000 according to at least one embodiment includes a plurality of preprocessing units 1011, 1012, 1013, 1014, 1015, 1016, 1017, 1018, a plurality of selection units 1021, 1022, 1023, 1024, 1025, a first addition unit 1031, a 2nd addition unit 1032, a 3rd addition unit 1033, a multiplication unit 1040, and an accumulator 1050. The 3rd accumulated value calculation units 431, 432, 433, 434 may each be implemented by including this embodiment of sum-product operation apparatus 1000.

As a note, the sum-product operation apparatus 1000 according to this embodiment of the present disclosure exemplifies a configuration for providing the sum and product operation performed on an input in units of N bits. The following illustrates the case where N=16.

The first preprocessor 1011 receives and stores an N-bit long input matrix Y element value $y_{2k,j}$ in the first bitmap, and copies the sign bit of the N-bit matrix element value $y_{2k,j}$ to the (N+1)th bit of the first bitmap to generate a sign-extended first bitmap $\{SignExt(y_{2k,j})\}$ of N+1-bit length. Here, when N is 16, the length of the sign-extended N+1-bit long first bitmap becomes 17 bits.

The 2nd preprocessor 1012 receives and stores two N/2-bit long input matrix Y element values $y_{4kj}$ and $y_{4k-2,j}$ in the second bitmap, and copies and inserts the sign bit of the N/2-bit matrix element value $y_{4k-2,j}$ in the (N/2+1)th bit of the second bitmap to generate a $SignExt(y_{4k-2,j})$ of N/2+1-bit length and thereby generates a second bitmap $\{y_{4kj}, SignExt(y_{4k-2,j})\}$ of N+1-bit length. Here, $\{y_{4kj}, SignExt(y_{4k-2,j})\}$ is a bitmap arranged in the order of inputted $y_{4kj}$ and $\{SignExt(y_{4k-2,j})\}$ that is sign-extended $y_{4k-2,j}$.

The 3rd preprocessor 1013 receives and stores an N-bit long input matrix X element value $x_{i,2k-1}$ in the third bitmap, and copies the sign bit of the N-bit matrix element value $x_{i,2k-1}$ to the (N+1)th bit of the third bitmap to generate a sign-extended third bitmap $\{SignExt(x_{i,2k-1})\}$ of N+1-bit length.

The 4th preprocessor 1014 receives and stores two N/2-bit long input matrix X element values $x_{i,4k-1}$ and $x_{i,4k-3}$ in the fourth bitmap, and copies and inserts the sign bit of the N/2-bit matrix element value $x_{i,4k-3}$ in the (N/2+1)th bit of the fourth bitmap to generate a $SignExt(x_{i,4k-3})$ of N/2+1-bit length and thereby generates a fourth bitmap $\{x_{i,4k-1}, \text{SignExt}(x_{i,4k-3})\}$ of N+1-bit length. Here, $\{x_{i,4k-1}, \text{SignExt}(x_{i,4k-3})\}$ is a bitmap arranged in the order of the inputted $x_{i,4k-1}$ and $\{\text{SignExt}(x_{i,4k-3})\}$ that is sign-extended $x_{i,4k-3}$.

The 5th preprocessor 1015 receives and stores an N-bit long input matrix X element value $y_{2k-1,j}$ in the fifth bitmap, and copies the sign bit of the N-bit matrix element value $y_{2k-1,j}$ to the (N+1)th bit of the fifth bitmap to generate a sign-extended fifth bitmap $\{\text{SignExt}(y_{2k-1,j})\}$ of N+1-bit length.

The 6th preprocessor 1016 receives and stores two N/2-bit long input matrix Y element values $y_{4k-1,j}$ and $y_{4k-3,j}$ in the sixth bitmap, and copies and inserts the sign bit of the N/2-bit matrix element value $y_{4k-3,j}$ in the (N/2+1)th bit of the sixth bitmap to generate a $\text{SignExt}(y_{4k-3,j})$ of N/2+1-bit length and thereby generates a 6th bitmap $\{y_{4k-1,j}, \text{SignExt}(y_{4k-3,j})\}$ of N+1-bit length. Here, $\{y_{4k-1,j}, \text{SignExt}(y_{4k-3,j})\}$ is a bitmap arranged in the order of $y_{4k-1,j}$ and $\{\text{SignExt}(y_{4k-3,j})\}$ that is sign-extended $y_{4k-3,j}$.

The 7th preprocessor 1017 receives and stores the input element values $x_{i,2k}$ of the N-bit matrix X in the seventh bitmap, and copies the sign bit of an N-bit matrix element value $x_{i,2k}$ to the (N+1)th bit of the seventh bitmap to generate a sign-extended seventh bitmap $\{\text{SignExt}(x_{i,2k})\}$ of N+1-bit length.

The 8th preprocessor 1018 receives and stores two N/2-bit long input matrix X element values $x_{i,4k}$ and $x_{i,4k-2}$ in the eighth bitmap, and copies and inserts the sign bit of the N/2-bit matrix element value $x_{i,4k-2}$ in an (N/2+1)th bit of the 8th bitmap to generate $\text{SignExt}(x_{i,4k-2})$ of N/2+1-bit length and thereby generates an 8th bitmap $\{x_{i,4k}, \text{SignExt}(x_{i,4k-2})\}$ of N/2+1-bit length. Here, $\{x_{i,4k}, \text{SignExt}(x_{i,4k-2})\}$ is a bitmap arranged in the order of $x_{i,4k}$ and $\{\text{SignExt}(x_{i,4k-2})\}$ that is sign-extended $x_{i,4k-2}$.

Here, when N is 16, the lengths of the first to eighth bitmaps are each N+1 which equals 17 bits.

As a note, in relation to the input of matrix element values in the N/2 bit mode, for example, the 4th preprocessor 1014 receives the matrix element values inputted in the order of $\{x_{i,1}, x_{i,3}\}, \{x_{i,5}, x_{i,7}\}, \{x_{i,9}, x_{i,11}\}$, and the 8th preprocessor 1018 receives the matrix element values inputted in the order of $\{x_{i,2}, x_{i,4}\}, \{x_{i,6}, x_{i,8}\}, \{x_{i,10}, x_{i,12}\}$.

The first to fifth selection units 1021, 1022, 1023, 1024, and 1025 operate differently by each inputted S value.

Responsive to the S value inputted as 0, the first selection unit 1021 selects and inputs the first bitmap $\{\text{SignExt}(y_{2k,j})\}$ between the inputs of the first bitmap $\{\text{SignExt}(y_{2k,j})\}$ and the second bitmap $\{y_{4k,j}, \text{SignExt}(y_{4k-2,j})\}$ to the first addition unit 1031.

Responsive to the S value inputted as 0, the 2nd selection unit 1022 selects and inputs the third bitmap $\{\text{SignExt}(x_{i,2k-1})\}$ between the inputs of the third bitmap $\{\text{SignExt}(x_{i,2k-1})\}$ and the fourth bitmap $\{x_{i,4k-1}, \text{SignExt}(x_{i,4k-3})\}$ to the first addition unit 1031.

Responsive to the S value inputted as 0, the 3rd selection unit 1023 selects and inputs the input fifth bitmap $\{\text{SignExt}(y_{2k-1,j})\}$ between the inputs of the fifth bitmap $\{\text{SignExt}(y_{2k-1,j})\}$ and the sixth bitmap $\{y_{4k-1,j}, \text{SignExt}(y_{4k-3,j})\}$ to the 2nd addition unit 1032.

Responsive to the S value inputted as 0, the 4th selection unit 1022 selects and inputs the seventh bitmap $\{\text{SignExt}(x_{i,2k})\}$ between the inputs of the seventh bitmap $\{\text{SignExt}(x_{i,2k})\}$ and the eighth bitmap $\{x_{i,4k}, \text{SignExt}(x_{i,4k-2})\}$ to the 2nd addition unit 1032.

On the other hand, in the case that the S value is 1, the first selection unit 1021 and the 2nd selection unit 1022 select and input the second bitmap $\{y_{4k,j}, \text{SignExt}(y_{4k-2,j})\}$ and the fourth bitmap $\{x_{i,4k-1}, \text{SignExt}(x_{i,4k-3})\}$ to the first addition unit 1031, respectively.

Additionally, in the case that the S value is 1, the 3rd selection unit 1023 and the 4th selection unit 1024 select and input the sixth bitmap $\{y_{4k-1,j}, \text{SignExt}(y_{4k-3,j})\}$ and the eighth bitmap $\{x_{i,4k}, \text{SignExt}(x_{i,4k-2})\}$ to the 2nd addition unit 1032, respectively.

The first addition unit 1031 and the 2nd addition unit 1032 to be described below may each be implemented as a duplex addition unit, and the detailed configuration thereof is obvious to those skilled in the art, thus no further description related to the configuration is provided.

In the case that the S value is 0, the first addition unit 1031 adds and inputs the first bitmap $\{\text{SignExt}(y_{2k,j})\}$ and the third bitmap $\{\text{SignExt}(x_{i,2k-1})\}$ together to the multiplication unit 1040.

In the case that the S value is 0, the 2nd addition unit 1032 adds and inputs the fifth bitmap $\{\text{SignExt}(y_{2k-1,j})\}$ and the seventh bitmap $\{\text{SignExt}(x_{i,2k})\}$ together to the multiplication unit 1040.

In the case that the S value is 0, the first addition unit 1031 and the 2nd addition unit 1032 perform N+2 bit addition.

In the case that the S value is 1, the first addition unit 1031 adds and inputs the second bitmap $\{y_{4k,j}, \text{SignExt}(y_{4k-2,j})\}$ and the fourth bitmap $\{x_{i,4k-1}, \text{SignExt}(x_{i,4k-3})\}$ together to the multiplication unit 1040.

In the case that the S value is 1, the 2nd addition unit 1032 adds and inputs the sixth bitmap $\{y_{4k-1,j}, \text{SignExt}(y_{4k-3,j})\}$ and the eighth bitmap $\{x_{i,4k}, \text{SignExt}(x_{i,4k-2})\}$ together to the multiplication unit 1040.

In the case that the S value is 1, the first addition unit 1031 and the 2nd addition unit 1032 split each of two input bitmaps into bitmaps in half and perform N/2+1 bit addition twice. For example, the first addition unit 1031 adds $y_{4k,j}$ and $x_{i,4k-1}$ together, which are the respective upper bit data items of the second bitmap and the fourth bitmap to provide an upper bit addition result, adds $\text{SignExt}(y_{4k-2,j})$ and $\text{SignExt}(x_{i,4k-3})$ together, which are the respective lower bit data items of the second bitmap and the fourth bitmap to provide a lower bit addition result, and inputs the upper and lower bit addition results to the multiplication unit 1040. Additionally, the 2nd addition unit 1032 generates an upper bit addition result obtained by adding $y_{4k-1,j}$ and $x_{i,4k}$ together, which are the respective upper bit data items of the sixth bitmap and the eighth bitmap to provide an upper bit addition result, adds $\text{SignExt}(y_{4k-3,j})$ and $\text{SignExt}(x_{i,4k-2})$ together, which are the respective lower bit data items of the sixth bitmap and the eighth bitmap to provide a lower bit addition result, are added to each other, and inputs the upper and lower bit addition results to the multiplication unit 1040.

Hereinafter, the multiplication unit 1040 to be described may be implemented as a duplex multiplication unit, and the detailed configuration thereof is obvious to those skilled in the art, thus no further description about the configuration is provided.

In case that the S value is 0, the multiplication unit 1040 performs 18-bit multiplication to output a 36-bit multiplication result and input the result to the 5th selection unit 1025. In particular, the multiplication unit 1040 multiplies by each other the addition result of the first addition unit 1031 when the S value is 0 and the addition result of the 2nd addition unit 1032 when the S value is 0 to input the multiplication result to the 5th selection unit 1025.

In case that the S value is 1, the multiplication unit 1040 performs 9-bit multiplication twice, outputs two 18-bit multiplication results, and inputs them to the 3rd addition unit 1033. For example, when the S value is 1, the multiplication unit 1040 multiplies the upper bit addition result from the first addition unit 1031 and the upper bit addition result from the 2nd addition unit 1032 together to output an 18-bit output as a first multiplication result, multiplies the lower bit addition result from the first addition unit 1031 and the lower bit addition result from the 2nd addition unit 1032 together to output another 18-bit output as a second multiplication result, and inputs the first and second multiplication results to the 3rd addition unit 1033.

The 3rd addition unit 1033 inputs the result of adding the first multiplication result and the second multiplication result from the multiplication unit 1040 together to the 5th selection unit 1025.

In case that the S value is 0, the 5th selection unit 1025 outputs a 36-bit multiplication result inputted from the multiplication unit 1040 to the accumulator 1050.

In case that the S value is 1, the 5th selection unit 1025 outputs the result inputted from the 3rd addition unit 1033 to the accumulator 1050.

As a note, although the 3rd accumulated value calculation unit 431 may be implemented to include the sum-product operation apparatus 1000 according to this embodiment, its components of the first preprocessor 1011, 2nd preprocessor 1012, 5th preprocessor 1015, 6th preprocessor 1016, first selection unit 1021, and 3rd selection unit 1023 may be implemented to be located in the first accumulated value calculation unit 421.

Additionally, the 3rd preprocessor 1013, 4th preprocessor 1014, 7th preprocessor 1017, 8th preprocessor 1018, 2nd selection unit 1022, and 4th selection unit 1024 may be implemented to be located in the first row element value calculation unit 411.

FIG. 11 is a diagram of an operation apparatus or multiplication device 1100 according to a second embodiment, which can be used as first multiplication units 511, . . . of row element value calculation units 411, 412, 413, 414 and as 2nd multiplication units 521, . . . of the respective 2nd accumulated value calculation units 421, 422, 423, 424.

The following describes an example case where the multiplication device 1100 according to the second embodiment is employed as the first multiplication units 511, . . . of the row element value calculation units 411, 412, 413, 414.

The multiplication device 1100 according to the second embodiment includes a plurality of preprocessors 1111, 1112, 1113, 1114, a plurality of selection units 1121, 1122, 1123, a multiplication unit 1130, and an addition unit 1140.

The first preprocessor 1111 receives and stores the N-bit long input matrix X element value $x_{i,2k-1}$ in the first bitmap, and copies the sign bit of the element value $x_{i,2k-1}$ to the (N+1)th bit of the first bitmap and thereby generates a sign-extended first bitmap {SignExt($x_{i,2k-1}$)} of N+1 bit length.

The 2nd preprocessor 1112 receives and stores the two N/2-bit long input matrix X element values $x_{i,4k-1}$ and $x_{i,4k-3}$ in the second bitmap, and copies and inserts the sign bit of one N/2-bit matrix element value $x_{i,4k-3}$ in the (N/2+1)th bit of the second bitmap to generate SignExt($x_{i,4k-3}$) of N/2+1-bit length and thereby generates a second bitmap {$x_{i,4k-1}$, SignExt($x_{i,4k-3}$)} of N+1-bit length.

The 3rd preprocessor 1113 receives and stores an N-bit long input matrix X element value $x_{i,2k}$ in the third bitmap, and copies the sign bit of the N-bit matrix element value $x_{i,2k}$ to the (N+1)th bit of the third bitmap to generate a sign-extended third bitmap {SignExt($x_{i,2k}$)} of N+1 bit length.

The 4th preprocessor 1114 receives and stores two N/2-bit long input matrix X element values $x_{i,4k}$ and $x_{i,4k-2}$ in the fourth bitmap, and copies and inserts the sign bit of one N/2-bit matrix element value $x_{i,4k-2}$ in the (N/2+1)th bit of the fourth bitmap to generate SignExt($x_{i,4k-2}$) of N/2+1-bit length and thereby generate a fourth bitmap {$x_{i,4k}$, SignExt($x_{i,4k-2}$)} of N+1 bit length.

The first to third selection units 1121, 1122, and 1123 operate differently according to each input S value.

In case that the S value is 0, the first selection unit 1121 selects and inputs the first bitmap {SignExt($x_{i,2k-1}$)} between the inputs of first bitmap {SignExt($x_{i,2k-1}$)} and second bitmap {$x_{i,4k-1}$, SignExt($x_{i,4k-3}$)} to the multiplication unit 1130.

In case that the S value is 0, the 2nd selection unit 1122 selects and inputs the third bitmap {SignExt($x_{i,2k}$)} and between the inputs of third bitmap {SignExt($x_{i,2k}$)} and fourth bitmap {$x_{i,4k}$, SignExt($x_{i,4k-2}$)} to the multiplication unit 1130.

On the other hand, in case that the S value is 0, 1, the first selection unit 1121 and the 2nd selection unit 1122 each select and input the second bitmap {$x_{i,4k-1}$, SignExt($x_{i,4k-3}$)} and the fourth bitmap {$x_{i,4k}$, SignExt($x_{i,4k-2}$)} to the multiplication unit 1130, respectively.

The multiplication unit 1130 described below may be implemented as a duplex multiplication unit.

The multiplication unit 1130 may be implemented as a duplex multiplication unit, and a detailed configuration thereof will be apparent to those skilled in the art, thus no further description is provided.

In case that the S value is 0, the multiplication unit 1130 multiplies the selection result from the first selection unit 1121 by the selection result from the 2nd selection unit 1122 and inputs the multiplication result to the selection unit 1123.

In case that the S value is 1, the multiplication unit 1130 performs 9-bit multiplication twice, outputs two 18-bit multiplication results, and inputs them to the addition unit 1140. In particular, when the S value is 1, the multiplication unit 1130 multiplies to each other the upper bit data $x_{i,4k}$ of the second bitmap {$x_{i,4k-1}$, SignExt($x_{i,4k-3}$)} selected by the first selection unit 1121 and the upper bit data $x_{i,4k}$ of the fourth bitmap {$x_{i,4k}$, SignExt($x_{i,4k-2}$)} selected by the 2nd selection unit 1122 to provide a first multiplication result. Additionally, the multiplication unit 1130 multiplies to each other the lower bit data SignExt($x_{i,4k-3}$) of the second bitmap {$x_{i,4k-1}$, SignExt($x_{i,4k-3}$)} selected by the first selection unit 1121 and the lower bit data SignExt($x_{i,4k-2}$) of the fourth bitmap {$x_{i,4k}$, SignExt($x_{i,4k-2}$)} selected by the 2nd selection unit 1122 to provide a second multiplication result. The multiplication unit 1130 inputs the generated first multiplication result and the second multiplication result to the addition unit 1140.

The addition unit 1140 inputs the result of adding the first multiplication result and the second multiplication result from the multiplication unit 1130 together to the 3rd selection unit 1123.

In case that the S value is 0, the 3rd selection unit 1123 outputs the multiplication result inputted from the multiplication unit 1130 to the accumulator 512.

In case that the S value is 1, the 3rd selection unit 1123 outputs the result inputted from the addition unit 1140 to the accumulator 512.

In the case that the multiplication device 1100 according to the second embodiment is used as the 2nd multiplication units 521, . . . of the respective 2nd accumulated value calculation units 421, 422, 423 and 424, the first to fourth preprocessors 1111, 1112, 1113, and 1114 receive inputs of the other matrix Y element values as follows.

For example, the first preprocessor 1111 receives an N-bit long input matrix Y element value $y_{2k,j}$ and generates a sign-extended first bitmap {SignExt($y_{2k,j}$)} of N+1 bit length.

The 2nd preprocessor 1112 receives two N/2-bit long input matrix Y element values $y_{4k,j}$ and $y_{4k-2,j}$ and generates a second bitmap {$y_{4k,j}$, SignExt($y_{4k-2,j}$)} of N+1 bit length.

The 3rd preprocessor 1113 receives an N-bit long input matrix Y element value $y_{2k-1,j}$ and generates a sign-extended third bitmap {SignExt($y_{2k-1,j}$)} of N+1 bit length.

The 4th preprocessor 1114 receives the two N/2-bit long input matrix Y element values $y_{4k-1,j}$ and $y_{4k-3,j}$ and generates a fourth bitmap {$y_{4k-1,j}$, SignExt($y_{4k-3,j}$)} of N+1 bit length.

Meanwhile, the multiplication device 1100 according to the second embodiment is employed as the 2nd multiplication units 521, . . . of the respective 2nd accumulated value calculation units 421, 422, 423, 424, wherein the input matrix Y element values inputted to the first to fourth preprocessors 1111, 1112, 1113 and 1114 may follow suit the operational procedure of the input matrix X element values after being inputted to the first to fourth preprocessors 1111, 1112, 1113 and 1114, and thus no further description is provided.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

REFERENCE NUMERALS

200: matrix multiplication device
210: first operation unit
211, 212, 213, 214: element-X processing unit
220: 2nd operation unit
221, 222, 223, 224: element-Y processing unit
230: 3rd operation unit
231, 232, . . . , 246: element-Z processing unit
311: 11th storage unit
312: 12th storage unit
313: 13th storage unit
314: first multiplication unit
321: 21st storage unit
322: 22nd storage unit
323: 23rd storage unit
324: 2nd multiplication unit
331: first addition unit
332: 2nd addition unit
333: 3rd multiplication unit
334: accumulation operation unit
400: operation apparatus
410: element value calculation unit
411, 412, 413, 414: row element value calculation unit
420: 2nd accumulated value output unit
421, 422, 423, 424: 2nd accumulated value calculation unit
430: 3rd accumulated value output unit
431, 432, . . . , 446: 3rd accumulated value calculation unit
501: 2nd accumulated value storage unit
511: first multiplication unit
512: first accumulator
513: 11th storage unit
514: 12th storage unit
515: 13th storage unit
516: 14th storage unit
517: first summing unit

REFERENCE NUMERALS
-continued

521: 2nd multiplication unit
522: 2nd accumulator
523, 623, 624: 2nd selection unit
524: 21st storage unit
525: 22nd storage unit
531: 31st addition unit
532: 32nd addition unit
533: 3rd multiplication unit
534: 3rd accumulator
535, 635, 636: 3rd selection unit
800, 1000: sum-product operation apparatus
810: input division unit
820: first addition unit
830: 2nd addition unit
840: multiplication unit
850: accumulator
900: multiplication device
911: first input division unit
912: 2nd input division unit
913: first selection unit
914: 2nd selection unit
915: first sign extension unit
916: 2nd sign extension unit
917: first multiplication unit
918: multiplier selection unit
919: multiplier multiplication unit
1011, 1012, 1013, 1014, 1015, 1016, 1017, 1018: preprocessor
1021, 1022, 1023, 1024, 1025: selection unit
1031: first addition unit
1032: 2nd addition unit
1033: 3rd addition unit
1040: multiplication unit
1050: accumulator
1100: multiplication device
1111, 1112, 1113, 1014: preprocessor
1121, 1122, 1123: selection unit
1130: multiplication unit
1140: addition unit
S11, S12, S13, S21, S22, S23: accumulator

What is claimed is:

1. An operation apparatus operating based on the Winograd algorithm for multiplying a first matrix by a second matrix to generate a third matrix, comprising:
a second accumulated value output unit having a plurality of second accumulated value calculation units, of which one second accumulated value calculation unit is configured to accumulate second multiplication values obtained by multiplying each of paired element values of the second matrix, to select one of an output value of an adjacent second accumulated value calculation unit and the accumulated second multiplication value as a second accumulated value, and to output the second accumulated value;
a third accumulated value output unit having a plurality of third accumulated value calculation units, of which one third accumulated value calculation unit is configured to generate a first value obtained by adding one element value of paired element values of the first matrix and one element value of the paired element values of the second matrix, to generate a second value obtained by adding the other element value of the paired element values of the first matrix and the other element value of the paired element values of the second matrix, to accumulate a third multiplication value obtained by multiplying the first value by the second value, to select one of an output value of an adjacent third accumulated value calculation unit and the accumulated third multiplication value, as a third accumulated value, and to output the third accumulated value; and an element value calculation unit having one or more row element value calculation units, of which one row element value calculation unit is configured to accumulate element multiplication values of the first matrix obtained by multiplying each of the paired element values of the first matrix, and to calculate element values of the third matrix by subtracting from the third accumulated value an accumulated element multiplication value of the first matrix and the second accumulated value, respectively.

2. The operation apparatus of claim 1, wherein the one third accumulated value calculation unit corresponds in position to the one second accumulated value calculation unit and to the one row element value calculation unit.

3. The operation apparatus of claim 2, wherein the plurality of third accumulated value calculation units is formed in a two-dimensional systolic array, and the plurality of second accumulated value calculation units and the one or more row element value calculation units are each formed in a one-dimensional systolic array.

4. The operation apparatus of claim 3, wherein the plurality of second accumulated value calculation units are formed above the plurality of third accumulated value calculation units, and the one or more row element value calculation units are formed on side of the plurality of third accumulated value calculation units.

5. The operation apparatus of claim 1, further comprising:
a second accumulated value storage unit configured to store the second accumulated value outputted from the second accumulated value output unit.

6. The operation apparatus of claim 5, wherein the second accumulated value storage unit is located between the second accumulated value output unit and the one or more row element value calculation units.

7. The operation apparatus of claim 5, wherein the one row element value calculation unit is configured to calculate the element values of the third matrix by using the second accumulated value stored in the second accumulated value storage unit.

8. The operation apparatus of claim 1, wherein the one row element value calculation unit is configured to sequentially generate element values of rows which are among rows of the third matrix and corresponding to positions of the one or more row element value calculation units.

9. The operation apparatus of claim 8, wherein the one row element value calculation unit is configured to receive the third accumulated value delivered for calculating the element values of the third matrix from an adjacent third accumulated value calculation unit.

10. The operation apparatus of claim 2, wherein the third accumulated value calculation unit comprises:
an input division unit, a first addition unit, a second addition unit, a multiplication unit, and an accumulator, and
wherein the input division unit is configured to divide each of a bitmap representing one element value of the first matrix, a bitmap representing one element value of the second matrix, a bitmap representing another element value of the first matrix, and a bitmap representing another element value of the second matrix, into an upper divided bitmap and a lower divided bitmap in units of N bits that are of a bit length at an input terminal of the first addition unit,
the first addition unit is configured to add the one element value of the first matrix and the one element value of the second matrix to each other for each of selected divided bitmaps that are of equal rank between the upper divided bitmap and the lower divided bitmap,
the second addition unit is configured to add another element value of the first matrix and another element value of the second matrix to each other selectively for each of selected divided bitmaps that are of equal rank between the upper divided bitmap and the lower divided bitmap,
the multiplication unit is configured to calculate the third multiplication value by multiplying an addition result of the first addition unit by an addition result of the second addition unit, and
the accumulator is configured to generate the third accumulated value by accumulating the third multiplication value calculated by the multiplication unit.

11. The operation apparatus of claim 2, wherein the third accumulated value calculation unit comprises:
four preprocessors, a first addition unit, a second addition unit, a multiplication unit, a third addition unit, and an accumulator, and
wherein the preprocessors are each configured to receive paired matrix element values with a length of N bits (where N is a natural number), to place one element value of the paired matrix element values in an upper bitmap on a bitmap with a preset length, to place the other element value of the paired matrix element values in a lower bitmap on the bitmap with the preset length, and to extend signs of element values located in the lower bitmap by copying a sign bit of the other element value to an (N+1)th bit on the bitmap with the preset length to generate 2N+1-bit long bitmap data,
the first addition unit is configured to add data to each other that are on a bitmap with a preset length and generated by two preprocessors among the four preprocessors to generate a first result value,
the second addition unit is configured to add data to each other that are on a bitmap with a preset length and generated by two other preprocessors among the four preprocessors to generate a second result value,
the multiplication unit is configured to multiply by each other a value corresponding to an upper bitmap of the first result value and a value corresponding to an upper bitmap of the second result value to generate an 11th multiplication value, and to multiply by each other a value corresponding to a lower bitmap of the first result value and a value corresponding to a lower bitmap of the second result value to generate a 12th multiplication value,
the third addition unit is configured to add the 11th multiplication value and the 12th multiplication value to each other to generate the third multiplication value, and
the accumulator is configured to accumulate the third multiplication value.

12. The operation apparatus of claim 1, wherein the one or more row element value calculation units each comprise:
a multiplication unit configured to divide the paired element values of the first matrix into an upper bit group and a lower bit group, respectively, to sequentially select, in combination, and multiply by each other one bit group of the paired element values of the first matrix and the other bit group of the paired element values of the first matrix to generate a combination multiplication value, and sequentially multiplying the combination multiplication value by a multiplier corresponding to the selected combination to generate the element multiplication values of the first matrix.

13. The operation apparatus of claim 1, wherein the one or more row element value calculation units each comprise:
- a first preprocessor configured to form a first bitmap by copying a first element of the first matrix to an upper bit group of the first bitmap and copying a sign of a second element of the first matrix and the second element to a lower bit group of the first bitmap, respectively;
- a second preprocessor configured to form a second bitmap by copying a third element of the first matrix to an upper bit group of the second bitmap and copying a sign of a fourth element of the first matrix and the fourth element to a lower bit group of the second bitmap, respectively;
- a multiplication unit configured to multiply each other the upper bit group of the first bitmap and the upper bit group of the second bitmap to generate a first multiplication result, and to multiply each other the lower bit group of the first bitmap and the lower bit group of the second bitmap to generate a second multiplication result; and
- an addition unit configured to add the first multiplication result and the second multiplication result to each other to generate the first matrix element multiplication values.

* * * * *